US011656466B2

(12) United States Patent
Khan

(10) Patent No.: US 11,656,466 B2
(45) Date of Patent: May 23, 2023

(54) SPATIO-TEMPORAL MULTIPLEXED SINGLE PANEL BASED MUTUAL OCCLUSION CAPABLE HEAD MOUNTED DISPLAY SYSTEM AND METHOD

(71) Applicant: Sajjad Ali Khan, Santa Clara, CA (US)

(72) Inventor: Sajjad Ali Khan, Santa Clara, CA (US)

(73) Assignee: Sajjad A. Khan, Santa Clara, CA (US)

( * ) Notice: Subject to any disclaimer, the term of this patent is extended or adjusted under 35 U.S.C. 154(b) by 0 days.

(21) Appl. No.: 17/235,916

(22) Filed: Apr. 20, 2021

(65) Prior Publication Data

US 2021/0311311 A1  Oct. 7, 2021

Related U.S. Application Data

(63) Continuation-in-part of application No. 16/768,003, filed as application No. PCT/IB2019/000076 on Jan. 2, 2019, now Pat. No. 10,983,355.

(60) Provisional application No. 62/613,369, filed on Jan. 3, 2018, provisional application No. 62/740,119, filed on Oct. 2, 2018.

(51) Int. Cl.
  *G02B 27/01* (2006.01)
  *G09G 3/20* (2006.01)
  *G06F 3/01* (2006.01)

(52) U.S. Cl.
  CPC ....... *G02B 27/0172* (2013.01); *G09G 3/2007* (2013.01); *G02B 2027/0138* (2013.01); *G02B 2027/0178* (2013.01); *G06F 3/011* (2013.01)

(58) Field of Classification Search
  CPC ............... G02B 27/0172; G02B 27/01; G02B 27/0093; G02B 5/04; G02B 13/06;
  (Continued)

(56) References Cited

U.S. PATENT DOCUMENTS 5,555,329 A * 9/1996 Kuper .................. F21V 5/02
                                                   385/36
5,761,355 A * 6/1998 Kuper .................. G02B 6/0053
                                                   385/36
(Continued)

OTHER PUBLICATIONS

Austin Wilson and Hong Hua, "Design and prototype of an augmented reality display with per-pixel mutual occlusion capability," Opt. Express 25, 30539-30549 (2017).

*Primary Examiner* — Fred Tzeng

(57) ABSTRACT

A display method and system includes a module that intercepts the lightfield from an ambient Real World Scene in an observer's direct line-of-sight, 102, and then routes it through a spatial light modulator where the Scene forms an image. During a first portion of the frame time, selective pixels corresponding to the real world scene image on the SLM are modulated for their transparency or opacity and routed to the observer's eye. In a second portion of the frame time, a Digital computer generated Virtual image is created by spatially multiplexing a second illuminant on the same SLM and then routing it to the observer's eye. The resultant time-averaged image, as perceived by the observer, has the Real World Scene modulated for both its Transparency/opacity and also blended with computer generated Digital Virtual image. The present invention enables the ability to per-pixel hide or occlude physical objects in the Real World scene in the observer's direct line-of-sight, 102, and allows those to be replaced with computer generated Digital content in a pixel wise manner. Physical objects can be camouflaged and completely artificial objects, or remote people can be Digitally introduced into the observer's Physical environment where virtual shadows and virtual lighting can be generated on-demand. Therefore our invention allows blending of the Physical and Digital realms for a truly magical visual experience.

21 Claims, 10 Drawing Sheets

(58) Field of Classification Search
CPC .... G02B 30/33; G09G 3/2007; H04N 13/383; H04N 13/337; H04N 5/2258
See application file for complete search history.

(56) References Cited

U.S. PATENT DOCUMENTS

| | | | | |
|---|---|---|---|---|
| 6,685,322 | B2* | 2/2004 | Sawamura | G03B 21/005 |
| | | | | 353/33 |
| 7,483,216 | B2* | 1/2009 | Penn | G02B 5/04 |
| | | | | 359/638 |
| 7,817,341 | B2* | 10/2010 | Penn | G02B 26/0833 |
| | | | | 359/638 |
| 9,244,275 | B1* | 1/2016 | Li | G02B 27/01 |
| 10,175,491 | B2* | 1/2019 | Gao | H04N 5/2258 |
| 10,215,918 | B2* | 2/2019 | Xu | G02B 6/107 |
| 2002/0135763 | A1* | 9/2002 | MacKinnon | H05B 41/3922 |
| | | | | 356/326 |
| 2006/0028400 | A1* | 2/2006 | Lapstun | G02B 27/0093 |
| | | | | 345/8 |
| 2012/0062998 | A1* | 3/2012 | Schultz | B29D 11/00663 |
| | | | | 156/60 |
| 2014/0177023 | A1* | 6/2014 | Gao | G02B 13/06 |
| | | | | 359/238 |
| 2015/0264339 | A1* | 9/2015 | Riedel | H04N 13/383 |
| | | | | 348/54 |
| 2017/0329402 | A1* | 11/2017 | Riedel | H04N 13/337 |
| 2018/0157035 | A1* | 6/2018 | Fujita | B60K 35/00 |
| 2019/0004319 | A1* | 1/2019 | Karafin | G02B 30/33 |

* cited by examiner

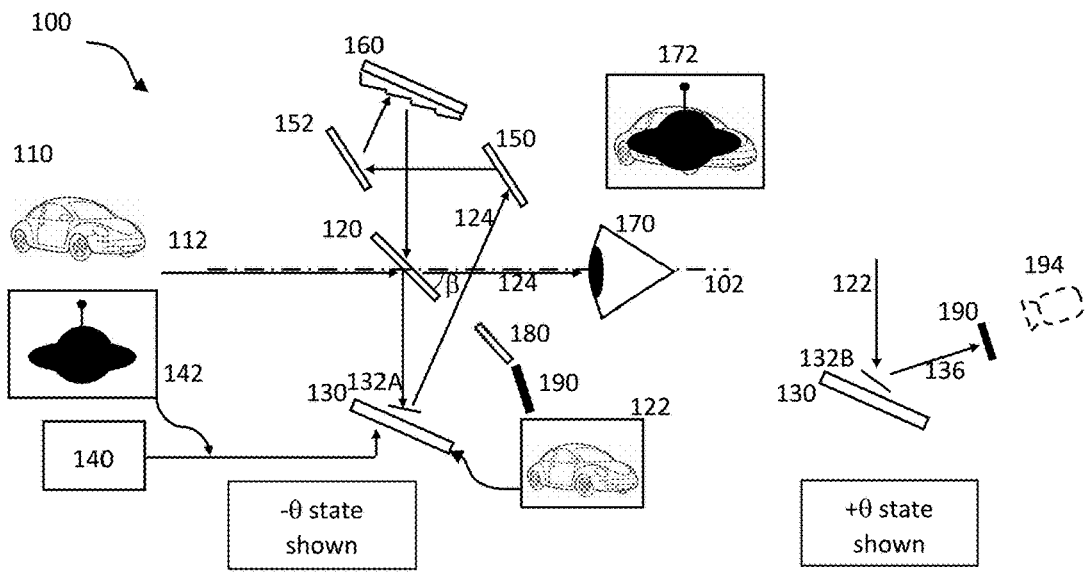
Figure 1(a).
Figure 1(b).
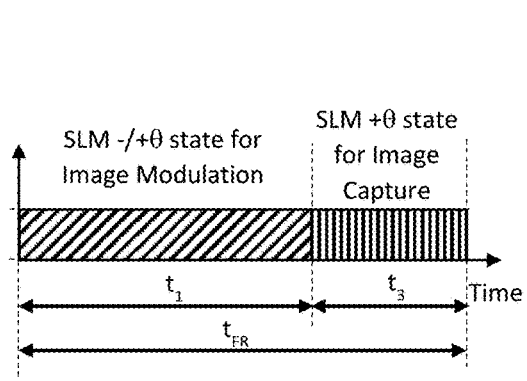
Figure 1(c).
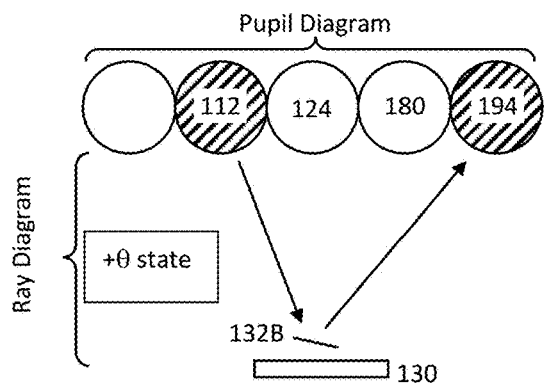
Figure 1(d).
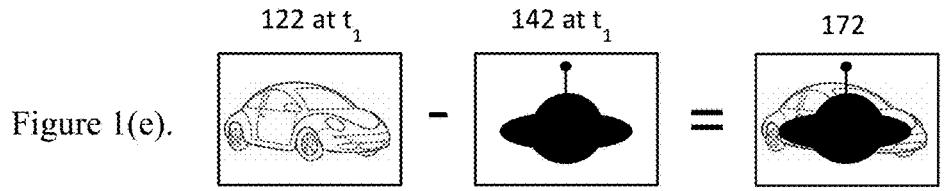
Figure 1(e).
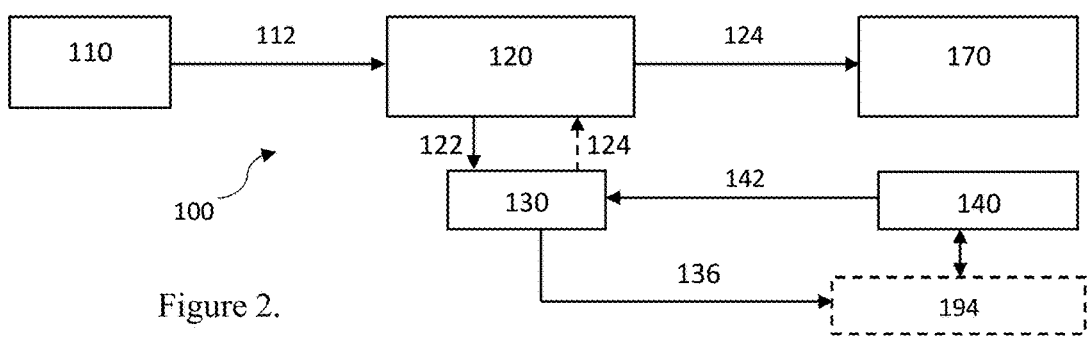
Figure 2.

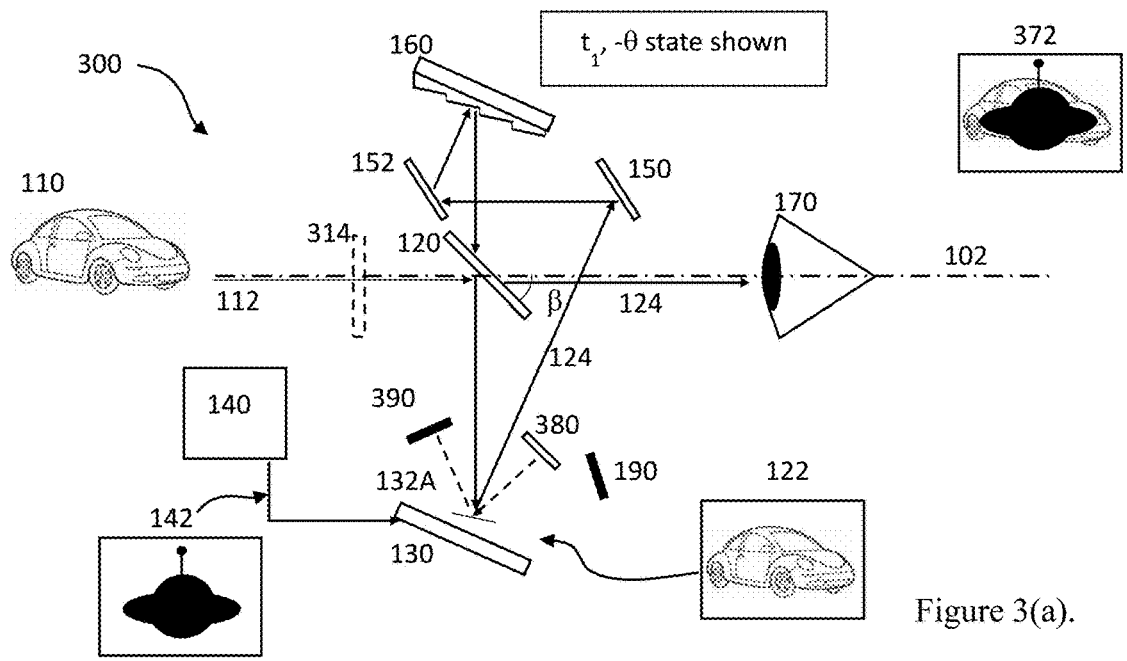
Figure 3(a).
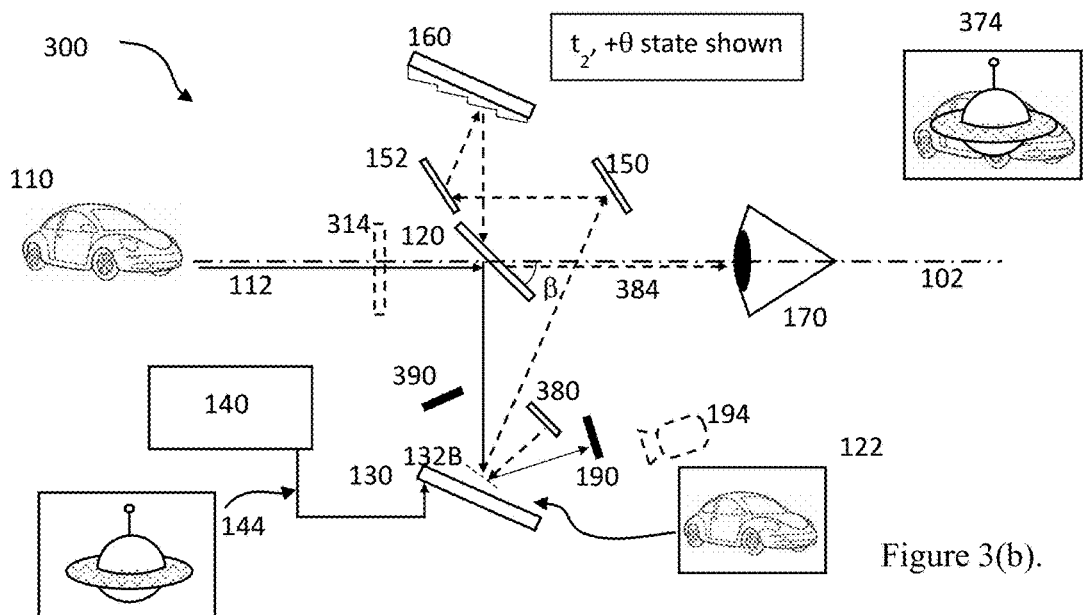
Figure 3(b).
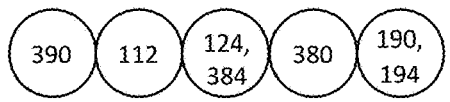
Figure 3(c).
| State | $t_1$<br>Ill. A On, D Off | $t_2$<br>Ill. A On, D On |
|---|---|---|
| $-\theta$ | $I_A * \eta_A * (t_1/t_{FR})$ | $I_A * \eta_A * (t_2/t_{FR})$ |
| $+\theta$ | 0 | $I_D * \eta_D * (t_2/t_{FR})$ |
Figure 3(d).
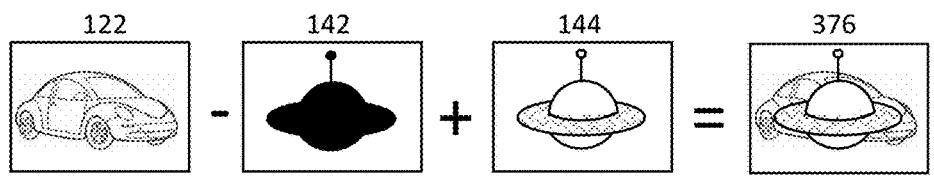
Figure 3(e).

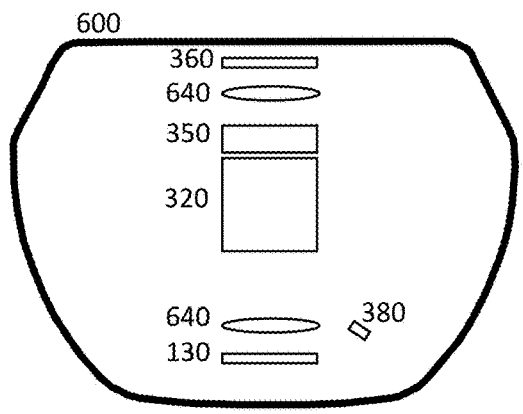
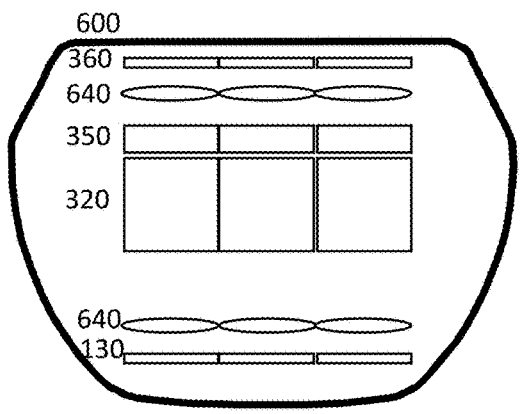
Figure 6(a).  Figure 6(b).
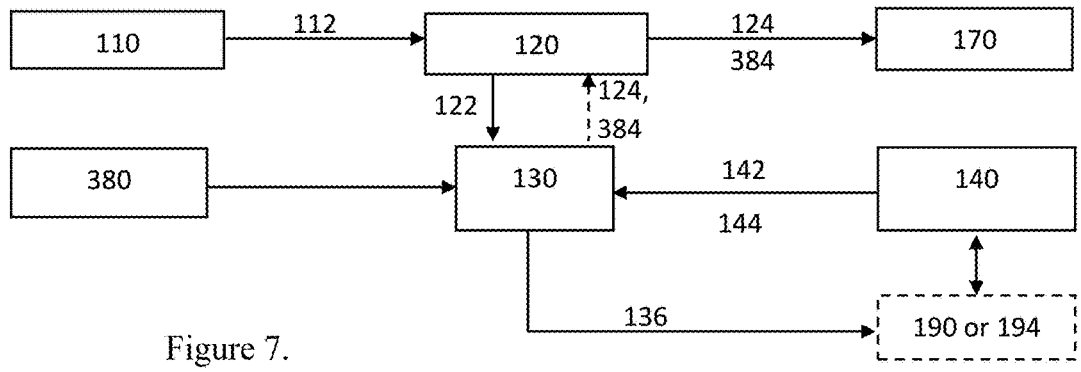
Figure 7.
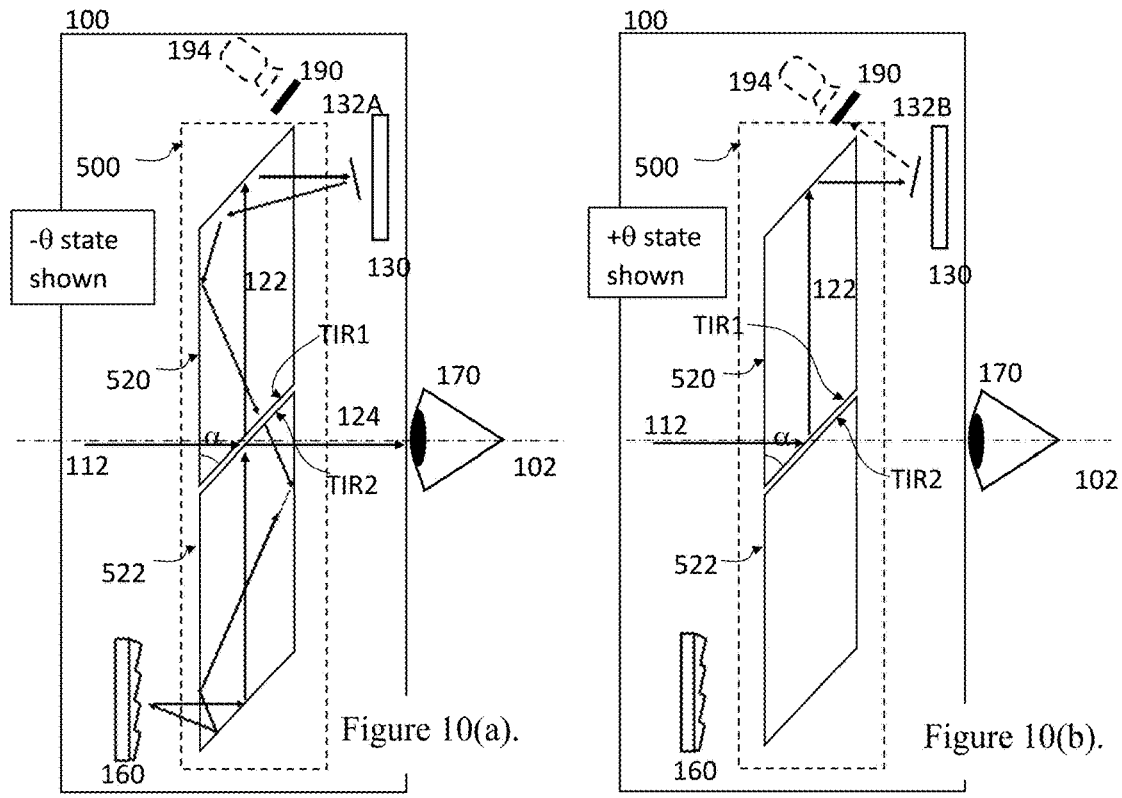
Figure 10(a).  Figure 10(b).

SPATIO-TEMPORAL MULTIPLEXED SINGLE PANEL BASED MUTUAL OCCLUSION CAPABLE HEAD MOUNTED DISPLAY SYSTEM AND METHOD

CROSS-REFERENCE TO RELATED PATENTS

This U.S. patent application is a Continuation-In-Part of U.S. patent application Ser. No. 16/768,003, filed on May 28, 2020.

This patent application claims priority to U.S. patent application Ser. No. 16/768,003, filed on May 28, 2020, and Paris Cooperation Treaty (PCT) Application No. PCT/IB2019/000076 filed on Jan. 2, 2019 which are hereby incorporated by reference here in their entirety. This application includes subject matter other than those included in the above-cited applications.

TECHNICAL FIELD

This relates generally to a system and method for displaying images, and more particularly, to Head Mounted Displays (HMD) and Near Eye Displays (NED) such as used in Augmented Reality, Virtual Reality or Mixed Reality and smart glasses applications.

BACKGROUND

Head mounted devices often include displays. These are used in Augmented Reality, Virtual Reality or Mixed Reality applications.

Previous works such as U.S. patent application Ser. No. 16/768,003 disclosed the use of cascaded SLM's to achieve mutual occlusion by dedicating one SLM for occlusion mask generation and another SLM for introducing virtual digital content into the light path via use of Polarization multiplexing. Such approaches add complexity to the display optics assembly, reduce optical-see-through efficiency by a factor of 2 and hence the system cost is roughly doubled. Power consumption is also increased due to the need for running two display module SLMs.

It would therefore be desirable to provide display systems for HMD electronic devices that provide mutual occlusion capability with (a) reduced complexity of the display optics assembly, (b) low cost (c) low power consumption and (d) higher optical-see-through efficiency.

U.S. Pat. No. 9,658,447 teaches method of using multiple illuminants that are pulsed ON and OFF alternatively in time domain such as with duty cycle of 50%/50% for each of the two illuminants as shown in FIGS. 5, 10A, 10B, 11A, 11B, 13A and 13B. Both illuminants are also located proximate the DMD unlike a physical scene from the Real world that is distantly located such as in a living room, office or industrial environment.

DESCRIPTION

The present disclosure relates generally to augmented reality display systems, and more particularly to display systems having enhanced capabilities.

An AR display may be head-mounted display (HMD), a Heads Up Display (HUD) or otherwise a conventional display such as a mobile device or a computer. A conventional AR display architecture uses an additive-only combiner to overlay computer generated virtual content on top of the real world scene.

Rendering occlusion of a virtual object by a real world object is quite simple: the real object is in-front of the virtual one, so one needs to render the virtual object only where the real object's boundaries end. This is called "Soft-Edge Occlusion". On the contrary, "Hard-Edge Occlusion" is defined as a scenario when a virtual object is depicted in front of a real world object. When a conventional AR display architecture is used, one can only try to increase the brightness of the virtual display but this increases the power consumption of the display illumination and moreover, the virtual object is still translucent or see-through.

Since contrast of a display is inversely related to the black level, hence it is preferable to instead route the light from the ambient real world environment to a spatial light modulator (SLM). This SLM can act as a selectable occlusion mask to control the localized contrast of the ambient real world scene and hence provider better occlusion capability. In our U.S. patent application Ser. No. 16/768,003 we disclosed the use of two cascaded SLM's using a polarization multiplexed optical approach to achieve mutual occlusion by dedicating one SLM for occlusion mask generation and another SLM for introducing virtual digital content into the light path. As the SLMs are pixelated devices, light from specific objects and directions can be blocked or attenuated at will. Such cascaded SLM approaches add complexity to the display optics assembly and hence the cost is roughly doubled. Power consumption is also increased due to the need for running two display module SLMs.

In this disclosure, we disclose display systems and method for HMD electronic devices that provide mutual occlusion capability using a single SLM for both (i) occlusion mask generation, and (ii) for introducing Digital virtual digital content into the light path. Such an approach reduces the complexity of the display optics assembly significantly and hence lowers the cost by approximately 50% than that of cascaded dual SLM approach. The proposed system also reduces power consumption significantly due to utilizing a single display SLM instead of two display modules as in the cascaded dual SLMs approach.

Our system utilizes the binary switchable nature of the Texas Instruments' (TI) Digital Light Processing (DLP) Technology MEMS based high speed Digital Micro-Mirror Device (DMD). This device has below inherent benefits:

i. High speed in the micro-seconds regime enabling completely digital Pulse Width Modulation (PWM),
ii. Binary-stable switching tilt angles enabling Spatial multiplexing,
iii. Polarization independency,
iv. High throughput efficiency,
v. Very fast frame-rate modulation enabling Temporal multiplexing of multiple illuminants,
vi. Agnostic to light source spectrum, polarization and coherence,
vii. Double the Etendue available than same active area polarized display panels such as LCoS, LCD, HTPS 3LCD and similar.

The above listed benefits are applicable to the variety of DMD pixel-types, including but not limited to Voltage Scalable Pixel (VSP) sometimes also called Diamond pixel, Tilt and Roll Pixel (TRP) and other designs.

FIG. 1(a) depicts one HMD embodiment, 100, where a lightfield 112 emanating from a Real World Scene, 110, is first intercepted by a routing combiner optic, 120. This interception happens in the direct line-of-sight, 102, of an observer's eye 170. The routing combiner optic, 120, routes the lightfield towards a Spatial Light Modulator (SLM) 130. In one example, the SLM 130 may be embodied by the binary switchable DMD from Texas Instruments. Other SLM technologies with multi-level switching capability may also be employed without deviating from the principle of current invention. Although not depicted in FIG. 1(a) HMD embodiment, 100, for the sake of simplicity, imaging optics are employed to form an intermediate image, 122, on the surface plane of the DMD thereby converting the lightfield, 112, into a planar image, 122. In the $-\theta$ binary state, 132A, of the DMD pixel, 130, the image, 122, is converted back into a lightfield, 124, and routed towards the routing combiner optic, 120, via a series of optical elements, Mirrors 150 and 152, and optical element 160. The optic, 160, maybe either a passive replica of the DMD in a single angular state: either $-\theta$ state or $+\theta$ state across its whole clear aperture, hence reflecting the incoming light at the opposite angle to undo the angular shift of the image caused by the DMD tilt angle in the first instance; or another active DMD in some embodiments. Such an optic, 160, can be manufactured using either nano-imprint technology, optical molding of micro-structures, lithographic processes, surface relief gratings, diffractive optical elements, Bragg reflective gratings, Liquid Crystals, flat mirror surface, bulk optics or a combination thereof. Note that the DMD SLM, 130, and optic element, 160, are located at conjugate planes therefore their location can be interchanged. The routing combiner optic, 120, then directs the modulated lightfield, 124, towards the observer's eye 170 such that the modulated lightfield, 124, substantially appears to be coming from the observer's direct line-of-sight, 102. In this manner the $-\theta$ state, 132A, enables a 'Transparent' or optical see-through view of the Real World Scene. As shown in FIG. 1(b), light incident in the $+\theta$ binary state, 132B, of the DMD pixel, 130, is routed towards a beam dump 190 away from the light path towards the observer's eye, 170. This routing of light away from the observer's line-of-sight, 102, creates an 'Opaque' or dark state. Since each of the DMD, 130, pixels can be Pulse Width Modulated (PWM) in time domain at very high speed, hence the Transparency or Opacity of the Real World Scene 110 can be pixel-wise controlled in a Digital grayscale fashion. In this manner, we Digitally control the Analog Scene arriving from the Physical World, 110, in a pixel-wise manner in the observer's direct line-of-sight, 102. Additionally, Virtual image content can be Digitally overlaid on top of the Physical World scene, 110, where each pixel can be either transparent, partially transparent or completely opaque via digital PWM control by the DMD in a grayscale manner. Thereby the image, 122, formed from the lightfield, 112, arriving from the physical Real World scene, 110, can be modulated by the DMD SLM, 130, with an electronic image, 142, that ranges from completely transparent to opaque or black in a pixel-wise manner. Note that the electronic image, 142, essentially provides pixel-wise transparency data to modulate the DMD pixels. Note that although we show only a single DMD pixel, 132, for the sake of explanation and clarity, an array of DMD pixels will behave similarly and hence are not shown due to redundancy and limited space. A controller, 140, can provide the DMD, 130, with such an electronic image, 142, to modulate the image, 122, formed of the Lightfield, 112, arriving from the Real World Scene, 110. This electronic image, 142, may be relevant information such as time, schedule, positioning coordinates, map, driving directions, or advertisements relevant to the Real World Scene, 110, in the observer's direct line-of-sight, 102. We emphasize that the DMD, 130, therefore modulates an incident image field, 122, with an electronic image, 142, thereby controlling the visibility of the Real World scene, 110, in a pixel-wise manner. Additional optical elements, such as relay optics and imaging optics may be utilized as necessary although not depicted in the FIG. 1(a) or 1(b) without deviating from the core principle of this invention. The modulated lightfield entering the observer's eye 170 forms an image 172 on their retina where Transparency/Opacity data 142 is overlaid on the Real World Scene 110. FIG. 1(e) shows a pictorial explanation of how the Transparency or alpha channel is temporally modulated to give the observer a perception of time-averaged occluded view. In this manner, we utilize the DMD SLM without a conventional illumination source such as a bulb, or lamp, or LED, or Laser light source which is always in close proximity of the DMD. Instead we utilize light, 112, from the Real World Scene, 110, such as from an ambient room environment, industrial or outdoor use scenarios and thereby not requiring a conventional illuminant and saving significant power consumption in the process. Additional means may be provided for adjusting the depth distance in the Real World Scene, 110, which is focused on the DMD plane, 130, for modulation purposes. These may be voice coil mechanisms, motors, Piezo electric transducers, or tunable lenses. Such a depth focus mechanism may be tied to the observer's gaze direction for auto-detecting the depth distance and correspondingly adjusting the focus mechanism so the correct depth plane is in focus properly so relevant virtual content can be displayed accordingly. The routing combiner optic, 120, may be chosen from amongst below choices: Mirrors, Thin Film Coatings, Polymeric multi-layer optical films (MOF), Total Internal Reflection (TIR) Prism, High-Low-High index optical interfaces, Holographic Bragg Materials, or a combination thereof, or arrays thereof.

FIG. 1(c) depicts timing diagram and FIG. 1(d) depicts the Pupil and Ray diagrams for another embodiment, where an image frame time $t_{FR}$, 410, is divided into a first time $t_1$ and a second time $t_3$ where $t_1$ is assigned for overlaying the Transparency or image modulation data, 142, on the optical see-through image, 122, while during time $t_3$ the DMD is switched to its $+\theta$ state binary state where the light, 136, is routed to a camera, 194, instead of the usual beam dump 190. This allows the camera, 194, to capture a direct first person view of the observer's direct line of sight in real time. The camera's shutter may be opened only during time $t_3$ so a captured image doesn't get modulated by the Transparency data 142. The captured image may also be modulated for controlling its dynamic range, hue and saturation as desired. The time durations $t_1$ and $t_3$ may be adjusted for a desirable balance between see-through transparency and proper exposure for the camera sensor. FIG. 2 shows a corresponding block diagram showing the above process in a pictorial fashion for the sake of clarity.

In another embodiment, we outline a methodology for utilizing spatio-temporal multiplexing of two illumination sources. For AR HMDs, these include the visible see-through Real World Scene in front of the observer, say Illuminant A where 'A' stands for 'Ambient', and the Digital content for virtually overlaying on the Real World Scene, Illuminant D where 'D' stands for 'Digital'. The two illuminants A and D are incident on the DMD from two different angular positions in the pupil diagram, hence the term "Spatially multiplexed". In FIGS. 3(a) and (b), shown in the HMD embodiment, 300, the two illuminants are Illuminant A depicted by the lightfield, 112, arriving from the Real World Scene, 110, in front of the observer that is to be modulated with transparency data, 142; and Illuminant D, 380, representing the Red, Green and Blue (RGB) LED illumination of the time-sequential illumination for creating the colored Digital Virtual content, 144, to be overlaid on the Real World Scene 110. Moreover, as shown in FIG. 4(*a*) we introduce a temporal modulation scheme where the frame time, $t_{FR}$, 410, is temporally sub-divided between two regions: time $t_1$, 420, which is dedicated for Illuminant A, 112; and time $t_2$, 430, which is dedicated for Illuminant D, 380. Note in FIG. 4 (*a-c*), $I_A$ identifies the intensity of Illuminant A, 112, while $I_D$ identifies the intensity of Illuminant D, 380, and $\eta_A$ and $\eta_D$ identify the throughput efficiency of the optical path for Illuminant A, 112, or Illuminant D, 380, respectively. During time $t_1$, 420, the DMD, 130, digitally controls the Real World Scene via by pixel-wise pulse-width modulating the see-through transparency of the Illuminant A, 112, via image, 142, thereby providing a pixel-wise transparency modulated alpha channel to the observer's eye, 170; whereas during time $t_2$, 430, the DMD digitally modulates the frame sequential RGB color illumination, Illuminant D, 380, in order to display the Digital virtual content 144 to be overlaid on the Analog scene coming from the Real World 110 in front of the observer. As described earlier and shown in FIG. 4(*b*), during time $t_1$, 420, a DMD pixel in the −θ binary state, 132A, will be routed to the observer's eye 170 in their direct line-of-sight, 102 and hence that pixel appearing Transparent or See-through whereas another DMD pixel in the +θ binary state, 132B, will be routed away from the observer's line-of-sight, 102, hence appearing substantially blocked from the observer's view and hence perceived as Opaque. Since the DMD, 130, can be Pulse Width Modulated (PWM) in time domain at very high speed, hence the Transparency or Opacity of the Real World Scene, 110, can be controlled in a Digital grayscale fashion during time $t_1$, 420. In this manner, during time $t_1$, 420, we Digitally control the Analog Scene arriving from the Physical World in a pixel-wise manner in the observer's direct line-of-sight, 102. Therefore time $t_1$, 420, is dedicated for providing an alpha channel for the optical see-through scene.

As shown in FIG. 4(*c*), time $t_2$, 430, is dedicated for illuminant D, 380, which represents the Red, Green and Blue (RGB) LED illumination of the time-sequential illumination for creating the colored Digital Virtual content 144 to be overlaid on the Real World Scene 110. During time $t_2$, 430, a DMD pixel in +θ binary state, 132B, will be routed to the observer's eye 170 and hence that pixel appearing bright with appropriate color. On the contrary, during time $t_2$, 430, a DMD pixel in −θ binary state, 132A, will be directed to a beam dump, 390, and hence that pixel appearing dark. The time $t_2$, 430, can be further sub-divided into Red, Green and Blue illumination time segments appropriately. Hence, during time $t_2$, 430, colored Virtual image content 144 can be Digitally overlaid on top of the Physical World Scene 110 where each pixel can have the desired luma and chroma value. Since a single SLM 130 performs the two tasks of creating the alpha transparency value 142 and adding colored Digital Virtual content 144, hence no image registration issues arise and the Digital Virtual content appears visible at the same depth to the observer as the Real World Scene distance that is in focus. Additional means may be provided for adjusting the depth distance in the Real World Scene 110 such as near or far so that the proper depth plane is focused on the DMD plane for modulation purposes. These may be voice coil mechanisms, motors, Piezo electric transducers, MEMS based solutions, or tunable lenses. Such a depth focus mechanism may be tied to the observer's gaze direction for auto-detecting the depth distance and correspondingly adjusting the focus mechanism so the correct depth plane is in focus properly so relevant virtual content can be displayed accordingly. Therefore, using our Spatio-Temporal technique enables both Transparency control, 142, and colored RGB information, 144, overlaid on the Real World scene, 110, in a pixel-wise manner. We hence achieve a display with Red, Green, Blue (RGB) and alpha coordinates normally denoted as (R, G, B, α). Since pixel-wise transparency control allows hard-edge occlusion, hence our smart Spatio-Temporal multiplexed approach enables a single (R, G, B, α) display which achieves pixel-wise hard-edge occlusion using only a single display panel thereby reducing cost, complexity while increasing see-through efficiency and battery life performance.

FIG. 3(*c*) shows the pupil diagram for the HMD embodiment, 300, and routing scheme according to the DMD pixel's angular state. Depending on the tilt angle state of the DMD, the two illuminants, 112 and 380 are routed differently as shown in FIG. 3(*a-d*). When the DMD is in −θ state such as shown in FIG. 3(*a*), the Illuminant A, 112, is reflected by the micro-mirror 132A in the −θ state in a direction such that it is routed, 124, towards the routing combiner optic, 120, via a series of optical elements as described for FIG. 1(*a*) in earlier paragraphs above. This light, 124, then passes through a couple of mirrors, depicted as 150 and 152 which combine to correct for the angular shift of the image caused by the DMD tilt angle. This light then reflects from another optic, 160, towards the routing combiner optic, 120. The routing combiner optic, 120, then routes the light 124 towards the observer's eye, 170 thereby creating a transparent state. If during time $t_1$, 420, the Micromirror is switched to the +θ state, 132B, then light is routed away from the observer's line-of-sight, 102, in the direction of the beam dump, 190 thereby creating a dark state. Illuminant D, 380, will reflect from the micro-mirror 132A in the −θ state to a beam dump, 390. But since time $t_1$, 420, is dedicated for Illuminant A, 112, hence Illuminant D, 380, is turned OFF during time $t_1$, 420, thereby fully dedicating time $t_1$, 420, for the modulation of the Illuminant A, 112, with transparency data, 142, to be overlaid on the Real World Scene, 110. Therefore, by assigning proper spatial directions and dedicated temporal durations $t_1$, 420, and $t_2$, 430, for Illuminant A, 112, and Illuminant D, 380, we are able to multiplex the two illuminants. The observer sees a transparency modulated image 372, and Digitally generated virtual image, 374, in quick succession, within a frame time, thereby perceiving a time-averaged image 376.

As depicted in FIG. 3(*b*), when the micro-mirror is in the +θ state, 132B, the Illuminant A, 112, is reflected by the micro-mirror, 132B, in the direction of a beam dump, 190; whereas light emitted by the Illuminant D, 380, is first reflected from the micro-mirror, 132B, in a direction such that it traverses light path through optics 150, 152, 160 and 120 to the observer's eye 170 as described earlier in earlier paragraph and depicted by ray 384, and thereby routed to the observer's line-of-sight, 102. If during time $t_2$, 430, the Micromirror is switched to the −θ state, 132A, then light from Illuminant D, 380, is routed away from the observer's line-of-sight, 102, in the direction of the beam dump, 390 thereby creating a dark state for Illuminant D, 380. Therefore, by switching the Micromirror in the −θ state, 132A, or the +θ state, 132B, during time $t_2$, 430, the DMD SLM, 130, can modulate light from the Illuminant D, 380, with a Digital input image, 144, thereby Digitally generating a Virtual image, 374, that is superimposed in the observer's direct line-of-sight, 102. Hence light from the two illuminants can be pixel-wise spatially combined and routed either to the observer's eye or away from it at will.

FIG. 3(d), shows the time-wise intensity throughput values for both Micromirror angular states +θ and −θ for estimating see-through dimming contrast.

FIG. 3(e), shows the how the optical see-through image, 122, is temporally modulated with transparency data, 142, and source color image data, 144 and how and how they result in a perceived image on the observer's retina with pixel-wise transparency and color modulation superimposed.

In FIG. 4(a-c), we describe the detailed temporal modulation scheme of this invention. First, FIG. 4(a) shows the relative intensity of the two illuminants, A, 112, and D, 380, for illustration purposes as $I_A$ and $I_D$ respectively. Since a display panel is operated at a certain frame rate, the panel gets refreshed at repeating intervals of frame time, $t_{FR}$, 410, where, $$t_{FR}=1/FR;$$

where FR is the video frame rate in cycles per second.

In order to selectively modulate the DMD display panel, the frame time, $t_{FR}$, 410, is temporally sub-divided between two regions: time $t_1$, 420, which is dedicated for controlling the pixel-wise transparency of the see-through Real scene or illuminant A; and time $t_2$, 430, which is dedicated for modulating the DMD with frame sequential color in order to display the Digital virtual content or illuminant D.

FIG. 4(b) shows the relative intensity of the two illuminants when the DMD micro-mirror is in −θ state. During time, $t_1$, the illuminant, A, gets a see-through relative intensity:

$$I_A * \eta_A;  \quad (1)$$

where $I_A$ and $\eta_A$ are the intensity and throughput efficiency of the optical system for Illuminant A, respectively. For such a system, in the transparent or see-through state, optical throughput efficiency, $\eta_A$, can be very high, of the order of 29% to 60% radiometric which is 45% to 78% photopic brightness as compared to the naked-eye view of the Real World scene. This high efficiency is primarily enabled by the polarization independent nature of the DMD and by not utilizing polarization sensitive optical elements such as polarizers and beam splitters. FIG. 4(c) shows the relative intensity of the two illuminants when the DMD micro-mirror is in +θ state. During time, $t_2$, the illuminant, D, 380, gets a relative intensity:

$$I_D * \eta_D;  \quad (2)$$

where $I_D$ and $\eta_D$ are the intensity and throughput efficiency of the optical system for Illuminant D, respectively. By multiplying the equation (1) and (2) above with time-weighted fractions $t_1/t_{FR}$, and $t_2/t_{FR}$, we can estimate the time-averaged relative intensities for the two illuminants, A and D. Conversely, we can adjust the relative intensities of the two illuminants, A and D, by controlling the time fractions, $t_1/t_{FR}$ and $t_2/t_{FR}$ which in turn controls the perceived intensities in the observer's eye. FIG. 3(d) shows these relative intensities for the two illuminants under the two different timing and angular positions in a tabular form. Note that each pixel in the DMD can be PWM modulated so individual pixel intensities will correspondingly also depend upon their PWM value. Also, note that since the intensity of the spatial locations in the Real World Scene, 110, may randomly vary, hence $I_A$, may have different values for different pixels. Therefore, to compensate for varying $I_A$, we propose another embodiment where the dimming range or contrast can be adjusted for individual pixels of electronic image, 142, by using input from camera captured content, 194, of the Real World Scene, 110, thereby enabling content-adaptive-dynamic-dimming of the scene.

FIG. 4(c) shows the relative intensity of the two illuminants when the DMD micro-mirror is in +θ state. During time $t_1$, 420, the illuminant A, gets a see-through relative intensity of 0 as the micro-mirror 132B directs light towards a beam dump 190 as shown in FIG. 3(b). This represents the opaque state where the real scene background can be selectively blacked-out in a pixel-wise manner. For time $t_2$, 430, the see-through relative intensity is $\eta_A*I_A$ for −θ state; and $\eta_D*I_D$ for +θ state; where $\eta_D$ is the optical efficiency of the system for Illuminant D. Therefore, the time averaged see-through relative intensity depends on the tilt state of the micro-mirror, which in turn depends on the grayscale value of the Digital video content to be displayed to the viewer. Thus, we now have a control over the transparency of the see-through scene in the range of a maximum value (45-78%) photopic to a minimum value determined by the ratio $t_2/t_{FR}$. The shorter the pulse-time ratio $t_2/t_{FR}$ the more transparency control is available to the observer. As an example, if $t_1/t_{FR}=0.9$ (or 90%), we are able to control the transparency from a maximum value of 45-78% to a minimum value of about 4.5-7.8%. FIG. 4(d) shows the achievable see-through dimming contrast ratio for such a spatio-temporal modulation scheme as a function of the ratio $t_1/t_{FR}$. Thus our Spatio-temporal multiplexing methodology provides a wide range of transparency control in a pixel-wise selectable manner as compared to the reference of conventional Augmented Reality HMDs that use a substantially transparent additive-only combiner without any mutual-occlusion capability and hence have no transparency control at all.

In FIG. 5 we show an HMD embodiment, 100, using a planar waveguide architecture uses spatio-temporal multiplexing to enable a compact system utilizing a single panel for both transparency and virtual image generation. The Total-Internal-Reflection (TIR) prisms, 520 and 522, form a waveguide routing combiner optic, 500, according to present invention. The DMD SLM, 130, is located at either the top or the bottom or on one edge of the waveguide: FIG. 5(a) shows routing scheme when the DMD SLM, 130, is in −θ state, 132A; FIG. 5(b) when the DMD SLM, 130, is in +θ state, 132B. Notice that the two trapezoidal prisms 520 and 522 are oriented such that a small air-gap forms between their adjacent faces. This air-gap creates the Total-Internal-Reflection (TIR) interfaces TIR1 and TIR2 in the adjacent faces of the two prisms 520 and 522 such that these two faces are substantially parallel. Hence this air-gap essentially acts as the routing combiner optic, which is labeled as 120 in FIGS. 1 and 3, except that the current embodiment allows an additional waveguiding function. Therefore, we label such a waveguide routing combiner optic as 500 which serves the purposes of combining, waveguiding and steering of light. Such a waveguide routing combiner optic, 500, enables a slim form factor for smart glasses applications. With such a slim TIR prisms, 520, and 522, based waveguide routing combiner optic, 500, our invention enables interception and modulation of the lightfield in the observer's direct line-of-sight, 102, to prevent any viewing point offset. The compactness of our invention is further enabled by creatively placing the imaging optics and SLM, 130, perpendicular to the line-of-sight, 102, of the observer, 170, as shown in FIG. 5(a-b). This allows for the HMD, 100, to be very thin, similar to prescription glasses form factor. Furthermore, the SLM, 130, and imaging optics can be located laterally, e.g.: above and below, or left-and-right, of the eye hence minimizing total volume of the HMD, 100.

Such lateral placement maximizes the use of available space in the glasses frame. The components utilized in such an architecture allow for the HMD system, 100, to be very compact and lightweight, thereby enabling their incorporation into typical prescription eyeglasses form factor. The total thickness maybe a few milli-meters and weight of less than 10 grams. As we highlight above, our invention solves the problems of view-point offset and compactness by innovatively locating only the combiner in front of the observer's eye while all other imaging optics and the SLM are located perpendicular to the observer's line-of-sight. This orthogonal choice of components' placement in this invention enables the (i) no-view-point-offset and, (ii) a few mm thickness for a compact HMD, 100.

FIG. 6 shows a frontal view of a possible spectacle lens design from the front when: FIG. 6(*a*) a single display system is utilized; and FIG. 6(*b*) multiple display systems are tiled side-by-side for a wider effective Field Of View (FOV) using a compact approach thereby increasing the FOV multiple-fold. Note that although we show tiling in the horizontal axis, it can be carried out in the vertical axis or any other orientation without deviating from the teachings of this invention so that it serves the purpose of FOV expansion and optimizing the form factor.

FIG. 7 shows the system block diagram showing the various components of the Spatio-Temporally multiplexed occlusion capable single panel display when two illuminants are used.

FIG. 8 shows the system optical pupil and ray diagrams for a tilt-only DMD pixel showing input output routing scheme for both illuminants, 112 and 380, when the DMD pixel is in: FIG. 8(*a*) −θ state, 132A, during the time $t_1$; FIG. 8(*b*) +θ state, 132B, during the time $t_1$; FIG. 8(*c*) −θ state, 132A, during the time $t_2$; FIG. 8(*d*) +θ state, 132B, during the time $t_2$; FIG. 8(*e*) +θ state, 132B, during an additional the time $t_3$ for routing the Lightfield, 112, arriving from the Real World Scene, 110, to a camera, 194. The dark circles represent the specific input and output angular locations that are actively used in the current DMD pixel state −/+θ and time $t_1$ or $t_2$. For example, in FIG. 8(*a*) −θ state, 132A, during the time $t_1$, light from pupil position 112 is being routed to pupil position 124 thereby creating a transparent state, whereas in FIG. 8(*d*) +θ state, 132B, during the time $t_2$, light from pupil position 380 is being routed to pupil position 384 thereby creating a bright pixel state for Illuminant D, 380. The gray hashed circles, 112 and 124, in FIG. 8(*c*), represent the leaked light from the Real World scene during the current angular location of the DMD pixel state −θ□□□□□□□ and time $t_2$.

FIG. 9 shows the system optical pupil and ray diagrams for a Tilt-and-Roll (TRP) DMD pixel showing input output routing scheme for both illuminants, 112 and 380, when the DMD pixel is in: FIG. 9(*a*) −θ state, 132A, during the time $t_1$; FIG. 9(*b*) +θ state during the time $t_1$; FIG. 9(*c*) −θ state, 132A, during the time $t_2$; FIG. 9(*d*) +θ state during the time $t_2$; FIG. 9(*e*) +θ state during an additional the time $t_3$ for routing the Lightfield, 112, from the Real World Scene, 110, to a camera, 194. The dark circles represent the specific input and output angular locations that are actively used in the current DMD pixel state −/+θ and time $t_1$ or $t_2$. For example, in FIG. 9(*a*) −θ state, 132A, during the time $t_1$, light from pupil position 112 is being routed to pupil position 124 thereby creating a transparent state, whereas in FIG. 9(*b*) +θ state, 132B, during the time $t_1$, light from pupil position 112 is being routed to pupil position 190 thereby creating an opaque or dark state. The gray hashed circles, 112 and 124, in FIG. 9(*c*), represent the leaked light from the Real World scene during the current angular location of the DMD pixel state −θ, 332A, and time $t_2$. Note that although in FIG. 8(*a-e*) and FIG. 9(*a-e*) we show pupil diagrams and ray diagrams corresponding to tilt-only DMD and tilt-and-roll DMD designs, other pupil shapes, locations, orientations, pixel architectures, tilt angles, and Illuminant positions can be achieved without deviating from the teachings of this invention.

FIG. 10 shows a an HMD, 100, using a planar waveguide routing combiner, 500, according to present invention using spatio-temporal multiplexing and TIR prisms 520, and 522, together serving as the waveguide routing combiner optic, 500, where the DMD SLM, 130, is located at either the top or the bottom or on one edge of the waveguide: FIG. 10(*a*) when the DMD SLM pixel is in the −θ state 132A; FIG. 10(*b*) when the DMD SLM pixel is in +θ state 132B. The various prims interfaces can be index matched or cemented to prevent unwanted Fresnel reflections and stray light. The only interface that needs a constant air gap is between the TIR prisms 520 and 522 pair.

FIG. 11 describes a step-wise method description according to present invention showing the various steps needed for achieving Spatio-Temporal multiplexing using a single SLM. The method includes, (1100) receiving an input lightfield from a Real World Scene, (1110) intercepting said input lightfield in the line-of-sight of an observer via a routing combiner optic, (1120) routing light away from said line-of-sight of said observer via said combiner optic, (1130) forming an intermediate image from said input lightfield via using an optical system on an SLM plane, (1140) providing commands to said SLM from a Controller for pixel-wise gray scale transparency/opacity modulation, (1150) said SLM performing pixel-wise gray scale modulation on said intermediate image formed of the input lightfield from the Real World Scene, (1160) converting said SLM modulated image back into an output modulated lightfield via a first optical system, (1170) routing said output modulated lightfield across said routing combiner optic, (1180) correcting image orientation, size, direction and handedness using a second optical system to ensure the output modulated lightfield will form an upright image on said observer's retina, (1190) directing said output modulated lightfield via the second side of said combiner optic towards said observer's eye so that it appears substantially collinear with said input lightfield in the observer's line-of-sight.

FIG. 12 shows how a spectacle lens may look like when utilizing a compact planar waveguide approach 500 as shown earlier in FIG. 5(*a-b*) and FIG. 10(*a-b*). FIG. 12(*a*) shows a view from the temple side using two trapezoidal prisms 520 and 522; FIG. 12(*b*) shows a view from the temple side using two parallelogram prisms 520 and 522; FIG. 12(*c*) shows a view from the temple side using a parallelogram prism 520 and a trapezoidal prism 522; FIG. 12(*d*) shows front view of the spectacles using two trapezoidal prisms 520 and 522 stacked vertically and FIG. 12(*e*) shows front view of the spectacles using two trapezoidal prisms 520 and 522 stacked horizontally.

FIG. 13 shows a side view of detailed light routing scheme in a spectacle lens when utilizing a compact planar waveguide routing combiner optic, 500, as shown earlier in FIGS. 5(*a-b*), FIG. 10(*a-b*) and FIG. 12(*a-e*). FIG. 13(*a*) shows how light entering at a certain first range of incident angle 1320 at the input aperture IA is refracted through the two trapezoidal prisms, 520 and 522, and arrives at the output aperture OA. When light enters at a certain second range of incident angle 1330 at the input aperture IA is refracted into the first trapezoidal prism, 520, then totalinternally-reflected by TIR1 interface and waveguided laterally into the first trapezoidal prism, 520, until it arrives at intermediate output aperture IOA1, where it acts as a first illuminant on the SLM, 130. FIG. 13(*b*) shows how light modulated by the SLM 130 in the first angular state, 132A, is injected back into the first trapezoidal prism, 520, via intermediate input aperture, IIA1, by using its side AB, then waveguided inside first trapezoidal prism, 520, until it arrives at the TIR1 interface. Notice that since the DMD SLM, 130, modulates the angle of the incident light, therefore the modulated light now incident at the TIR1 interface is at a different incident angle than the one at the first instance, 1330, such that it is refracted out of prism, 520, into the airgap. This modulated light, after passing through the airgap then refracts into the second trapezoidal prism, 522, via interface, TIR2. This modulated light is then total-internally-reflected inside the second trapezoidal prism, 522, until it is refracted out of the side GH of the second trapezoidal prism, 522. A passive mirror M and the optical element, 160, are utilized to route light back into the second trapezoidal prism 522 via intermediate output aperture, IOA2. FIG. 13(*c*) shows how light in injected back into the second trapezoidal prism, 522, via intermediate input aperture IIA2, where it is again total-internally-reflected via interface GH and then waveguided inside the second trapezoidal prism, 522, until it arrives at the TIR2 interface where it undergoes a total internal reflection and is extracted out of the second trapezoidal prism, 522, via the output aperture OA. FIGS. 13 (*a*)-(*c*) are drawn to show step-wise light ray routing diagrams for the sake of clarity. Only a single SLM angular state, 132A, is shown for clarity purposes. The second angular state of the SLM, 132B, is not shown in FIG. 13 as it will route light away from the first trapezoidal prism, 520, and hence will not substantially interact with the planar waveguide routing combiner, 500.

In another embodiment, when even further control is needed over the transparency, the illuminant A, 112, can be blocked selectively via the use of an electrically controlled shutter as depicted by an optional component, 314 in FIG. 3(*a-b*). This allows the illuminant A, 112, to be turned off for time $t_2$, so that the transparency is controlled from a maximum value of 45-78% to a minimum value of about 0%. Such transparency control enables visibility of High Dynamic Range (HDR) content for optical see-through Augmented Reality smart glasses even in broad daylight.

Since the visibility of the Digital virtual content depends upon the ratio of $t_2/t_{FR}$, hence Black level, contrast, and perceivable number of gray shades (or bit-depth) will be determined by the sub-frame time $t_2$ allocated to the RGB LED illumination sources. Since both the DMD and the RGB LEDs used for illuminant D are semi-conductor devices with very high speed modulation capability, hence the sub-frame time $t_2$ can be reduced to a very small percentage of the $t_{FR}$, 410, so that the leakage from $-\theta$ state of the DMD is negligible. Texas Instruments' DMD devices are readily available with kilohertz frame rates. In some embodiments, the ratio $t_2/t_{FR}$, may be <30% whereas in other embodiments, it maybe <1% thereby enabling almost two orders of magnitude pixel-wise dimming control.

In another embodiment, since the RGB LEDs offer a wide range modulation of their luminance output via input current control, one can increase the amplitude $I_D$ on a per color basis to increase the contrast between the Digital and Real scene, $I_D/I_A$ such that this contrast stays above a threshold value. The wide luminance intensity range available via the LED drive current and its high speed rise and fall times compensate for the short pulse-widths ratio $t_2/t_{FR}$ available due to limited duty cycle for Virtual Image Content.

Both of these benefits of LEDs enable high contrast and bit-depth via control of their behavior in the time domain. Although we describe the use of LEDs, other illumination technologies, such as Lasers, diode Lasers, lamps, phosphors, quantum dots, Organic LEDs and similar can be utilized to serve the purpose of Illuminant D, 380, without deviating from the teachings of this invention.

U.S. Pat. No. 9,658,447 teaches method of using multiple illuminants that are pulsed ON and OFF alternatively in time domain such as with duty cycle of 50%/50% for each of the two illuminants as shown in their FIGS. 5, 10A, 10B, 11A, 11B, 13A and 13B. Both illuminants are also located proximate the DMD. The 50% duty cycle for each of the two illuminants is employed such that the net duty cycle is 100% when utilizing the DMD at elevated ambient temperatures for reliability reasons. On the contrary, our approach has multiple salient differences:

i. it utilizes a lightfield from a physical scene in the Real world, 110, as an illuminant, 112;

ii. unlike conventional DMD illuminants which only concern with diffuse illumination intensity and uniformity on the SLM, our approach forms a high fidelity image on the DMD surface from the illuminant lightfield, 112; therefore an image serves as an illuminant on the DMD;

iii. unlike conventional DMD based displays where an illumination intensity is modulated, our approach pixel-wise modulates an incident image, not an illumination source;

iv. unlike conventional DMD based displays which form a single image, our approach first modulates an image of the Lightfield, 112, from the Real World Scene, 110, and creates a $2^{nd}$ image overlaid on the modulated first image of the Lightfield, 112, arriving from the Real World Scene, 110, where the first and second images can be the same or different;

v. the lightfield, 112, arriving from the Real world scene, 110, is distantly located such as in a living room, office or industrial environment and this distance ranges from several inches to infinity unlike typical DMD displays where the illuminants are in close proximity to the SLM such as a few centimeters.

vi. unlike U.S. Pat. No. 9,658,447 where only one of two illuminant is ON at any given time, our method has both illuminants, 112 and 380, ON simultaneously at least for a portion of the frame time; also note that one of our illuminants is always ON.

The above mentioned features of our invention are substantially unique, non-obvious and inventive with clear application in improving visibility, brightness and battery life of AR HMDs.

In another embodiment, in order to prevent dynamic modulation of the black level and hence contrast we propose inserting a fixed amount of leaked light in time domain, such as by adding another time pulse of $t_4$ which is equal to $t_2$ in width and the DMD micro mirrors are all in forced in the $-\theta$ state for the Lightfield, 112, arriving from the Real World Scene, 110, so it leaks a very tiny amount of light into the viewing window thereby reducing contrast to a fixed level for the virtual content. In another embodiment, $t_4$ is dynamically adjusted such that its width is equal to the width of the darkest gray level amongst the RGB primary pixel values across the whole image.

In another embodiment, the system may utilize a switchable shutter, 314, for preventing light leakage during time $t_2$ from the see-through path thereby improving the contrast and image quality.

In some of the FIGURES, optical components with optical power such as lenses or mirrors for focusing are not shown for the sake of simplicity but those familiar in the art can imagine their utilization in the appropriate locations, such as but not limited to light collection, focusing, imaging and magnification without deviating from the fundamental concept as taught in this invention.

In another embodiment, the contrast of the SLM is controlled such that the user can decide if they want maximum Transparency, or partial Transparency or maximum Opacity that is adjustable. Such an adjustable user control may be needed for safety reasons or maybe useful for personal preferences. Such control of the contrast can help minimize the power consumption via control of the bit-depth. For example if very low power consumption is preferred, then only binary control cane be utilized. This can help maximize Opacity by decreasing the leakage of light.

In another embodiment, as shown in FIG. 6(*b*), multiple display modules are laterally tiled such that the user gets an effectively wider FOV than that achieved with using a single display module.

The routing combiner optic, 120, can be immersed in an optical medium such as glass or plastic using index-matching optical adhesives to enable a slim form factor.

In another embodiment, the waveguide routing combiner optic, 500, consists of a Total-Internal-Reflection (TIR) prism pair with appropriately angled surfaces so as to provide the functionality of appropriately routing the light across the FOV and wavelength band of interest.

In another embodiment, the waveguide routing combiner optic, 500, consists of multiple airgap interfaces located adjacent to each other. An optically clear fluid is channeled into all but a single airgap interface allowing it to act as the TIR based combiner. This can be done with an air bubble traveling within the fluid channel such that the air bubble is channeled into a desired airgap on command from a controller, 140 whereas all other airgap interfaces are filled with said fluid. The Optically clear fluid can be chosen from materials that provide substantially index-matched optical parameters as compared to the substrate material of the waveguide routing combiner optic, 500. In one embodiment, the airgap interfaces may be substantially parallel. In another embodiment, the airgap interfaces may be non-parallel. Location of an observer's eye-gaze or lateral position can be captured with a camera and provided as an input to the controller, 140 so that it can determine which airgap interface must be utilized as the combiner interface and hence the air-bubble should be directed for positioning in that specific airgap interface. Such an array of airgap interfaces enables and HMD with pupil expansion in a switchable manner. Such a switchable pupil expansion solution thereby removes the loss of efficiency which results when using an array of conventional pupil expansion solutions, e.g.: multiple cascaded surface relief gratings, holographic material-based cascaded Bragg gratings, partially reflective coating based cascaded layers, polarization based partially reflective coating cascaded layers, either in one of two dimensions. Since these conventional pupil expansion solutions are passive, hence their loss in efficiency can be >90% due to their cascading nature. Therefore, such a switchable pupil expansion solution can improve efficiency by at least an order of magnitude and potentially even higher. Therefore it brings significant savings in power and battery consumption, and form-factor and weight reduction.

In another embodiment, mechanisms are provided for dynamically steering the routing combiner optic, 120, such as to allow steering of the FOV. The rotation can be either in one axis or two axes. The beam steering allows for the field of view (FOV) to be steered dynamical and on demand and hence the observer perceives a larger effective FOV than that without such beam steering.

Although lens elements are not shown in these figures, those familiar in the art can comprehend appropriate lenses, their optical behaviors, such as F/number, and locations so as to complete the optical system functionality. In addition one or more tunable lenses may be included in the optical design for adjusting the depth location.

Although we describe the various embodiments using the example of Texas Instruments' MEMS based Digital Micro-Mirror Device, other SLM technologies that provide similar bi-stable modulation capability can be utilized as well. The SLM is in principle a pixelated Light Valve which can be chosen from amongst a variety of display technologies either transmissive or reflective such as but not limited to: MEMS based SLMs, MEMS based micro-shutter arrays, Liquid Crystal on Silicon (LCoS), etc.

Note that the terms micro-display and SLM are interchangeably used in this disclosure.

In one embodiment, data from depth sensors can be utilized as input for determining specific depth at which objects in the Real World need to be occluded.

A method of displaying images, comprising: receiving lightfield from a Real World Scene; intercepting the lightfield in the line-of-sight, 102, of the observer's eye via a routing combiner optic; routing light away from the line-of-sight, 102, of the observer's eye via routing combiner optic; forming an intermediate image from the lightfield via using an optical system on an SLM plane; providing commands to the SLM from a Controller for pixel-wise gray scale transparency/opacity modulation; the SLM performing pixel-wise gray scale transparency/opacity modulation on the intermediate image formed of the Real World Scene; converting the SLM transparency/opacity modulated intermediate image back into a lightfield via an optical system; routing the modulated lightfield across the routing combiner optic; using an optical system to ensure the modulated lightfield will form an upright image with proper orientation, size, location and handedness on the observer's retina; directing the lightfield back towards the routing combiner optic so it appears to be emerging from the line-of-sight, 102, of the observer's eye.

Although we describe the invention with an exemplary DMD pixel type using −θ/+θ angular positions, a variety of other DMD pixel types including but not limited to Voltage Scalable Pixel (VSP) sometimes also called Diamond pixel, Tilt and Roll Pixel (TRP) and other designs are equally applicable as these all provide binary switchable stable angular positions. As an example we describe in FIG. 9(*a*)-(*e*) how a TRP DMD pixel will work when used in our invention with proper pupil routing and ray diagrams. Thus any bi-stable or multi-stable pixel SLM can be used without deviating from the core principle of this invention. Also note that the terms SLM' and 'panel' are interchangeably used in this disclosure and they both refer to a display panel that can spatially modulate light.

The present invention enables the ability to hide physical objects in the Real World scene in the observer's direct line-of-sight, 102, and allows those to be replaced with computer generated Digital content in a pixel wise manner.

Physical objects can be camouflaged and completely artificial objects can be Digitally introduced into the observer's Physical environment where virtual shadows and virtual lighting can be generated on-demand. Therefore our invention truly allows blending of the Physical and Digital realms for a truly magical visual experience.

Additional embodiments include use of the first-person camera view to enhance the image in at least one or more of the following methods:
i. To virtually increase brightness of the scene for people with blindness or vision challenges by increasing $I_D/I_A$ or by increasing $t_2/t_{FR}$;
ii. To virtually increase contrast of the scene for people with blindness or vision challenges by increasing $I_D/I_A$ or by increasing $t_2/t_1$;
iii. To improve/enhance color modulation of the scene for people with color blindness or vision challenges by increasing $t_2/t_1$;
iv. To digitally shift and present an enhanced captured image for people with Age-Related Macular Degeneration (AMD);
v. To reduce light sensitivity and Photophobia in patients with albinism by selectively reducing Real World Scene intensity as preferred by the observer;
vi. To improve vision via magnification of the optical-see-through image for patients with legal blindness (20/200 vision);
vii. If ambient scene, A, is dark (or OFF) such as at night time or for firemen in a fire, enhance their vision with an Infrared camera's view overlaid in their line-of-sight, 102;
viii. To digitally enhance colors such that advertisements visually stand-out w.r.t. their background;
ix. To adjust adaptive white balance of the Digital Virtual content by measuring ambient scene's average white point so the Physical world's and the Digital Virtual content's white points are the same;
x. To adaptively de-saturate the color of the Digital Virtual content by intentionally leaking a small amount of white (or gray) light in the image displayed to the observer.

BRIEF DESCRIPTION OF THE DRAWINGS

For a more complete understanding of the present disclosure and its advantages, reference is now made to the following description, taken in conjunction with the accompanying drawings, in which:

FIG. 1. Spatio-Temporally multiplexed Optical See-Through Augmented Reality Display architecture using a single DMD SLM; FIG. 1(a) −θ state of the DMD SLM; FIG. 1(b) +θ state of the DMD SLM showing camera in the OFF-state for capturing first-person view of the Real World Scene is the observer's direct line-of-sight, 102; FIG. 1(c) timing diagram showing temporal multiplexing of the Optical-See-Through Scene's Transparency modulation and first person view of the camera; FIG. 1(d) showing pupil diagram and corresponding ray diagram for utilizing camera in the +θ state of the DMD SLM; FIG. 1(e) showing a pictorial explanation of how the Transparency or alpha channel is temporally modulated to give the observer a perception of time-averaged occluded view;

FIG. 2. System block diagram showing the various components of the Spatio-Temporally multiplexed occlusion capable single panel display;

FIG. 3. Spatio-Temporally multiplexed Optical See-Through Augmented Reality Display architecture using a single DMD SLM with two illuminants; FIG. 3(a) −θ state of the DMD SLM; FIG. 3(b) +θ state of the DMD SLM showing a second illuminant 380 for use during time $t_2$, and camera 194 in the +θ state for capturing first-person view of the Real World Scene, 110, in the observer's direct line-of-sight, 102; FIG. 3(c) showing pupil diagram with both illuminants input output routing shown according to DMD 4+θ states for utilizing camera in the +θ state of the DMD SLM; FIG. 3(d); Table showing intensity estimates for four possible spatial and temporal combinations; 3(e); a pictorial explanation of how the Transparency or alpha channel is temporally combined with the Digital Virtual content to give the observer a perception of time-averaged occluded view;

FIG. 4(a) at the source; FIG. 4(b) Relative See-Through Intensity in the eyebox when the DMD SLM is in −θ state; FIG. 4(c) Relative See-Through Intensity in the eyebox when the DMD SLM is in +θ state; FIG. 4(d) See-Through Dimming contrast ratio as a function of ratio $t_1/t_{FR}$;

FIG. 6. A frontal view of how a spectacle lens may look like from the front when: 6(a) a single display system is utilized; 6(b) multiple display systems are tiled side-by-side for a wider effective FOV using a compact approach;

FIG. 7. System block diagram showing the various components of the Spatio-Temporally multiplexed occlusion capable single panel display when two illuminants are used;

FIG. 10. A planar waveguide approach 500 according to present invention using spatio-temporal multiplexing and trapezoidal TIR prisms for the routing combiner optic 520, and 522, where the DMD SLM is located at either top or bottom or on one edge of the waveguide: 10(a) when the DMD SLM pixel is in −θ state 132A; 10(b) when the DMD SLM pixel is in +θ state 132B;

FIG. 13(*a*)-(*c*) show successively step-wise progression of how light entering at the input aperture IA of the planar waveguide routing combiner, 500, is in-coupled, waveguided, modulated and routed to the output aperture OA in the user's direct line of sight, 102, without any viewing point offset.

Figure 4:
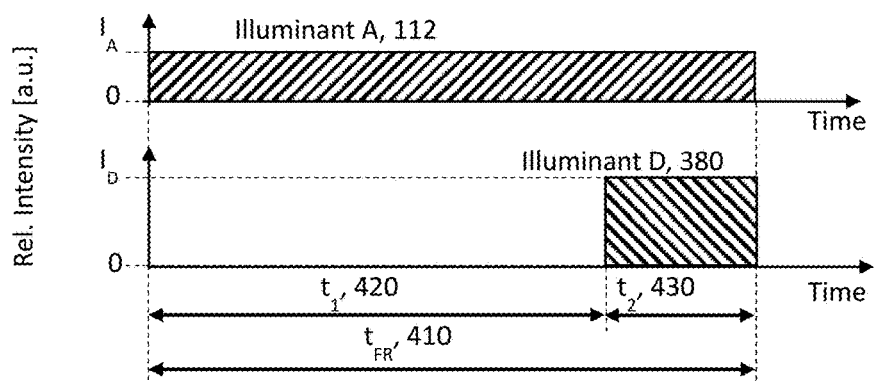
FIG. 4. Timing diagrams showing relative intensities of the two illuminants A, 112, and D, 380, during the frame time $t_{FR}$ 410.
Figure 4:
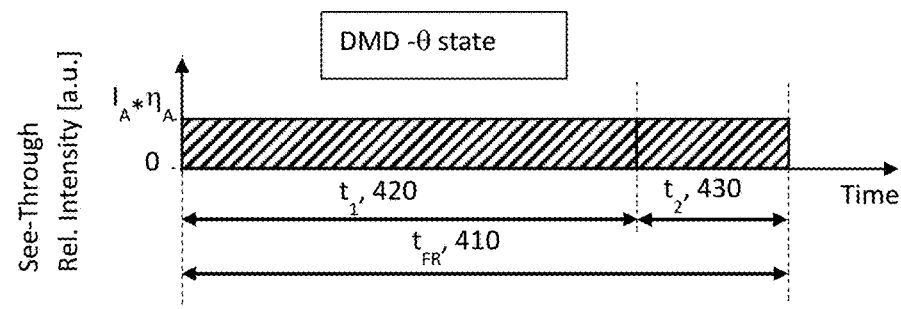
Figure 4:
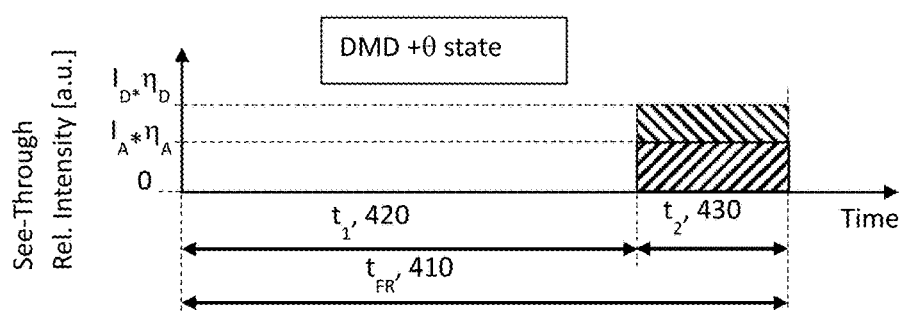
Figure 4:
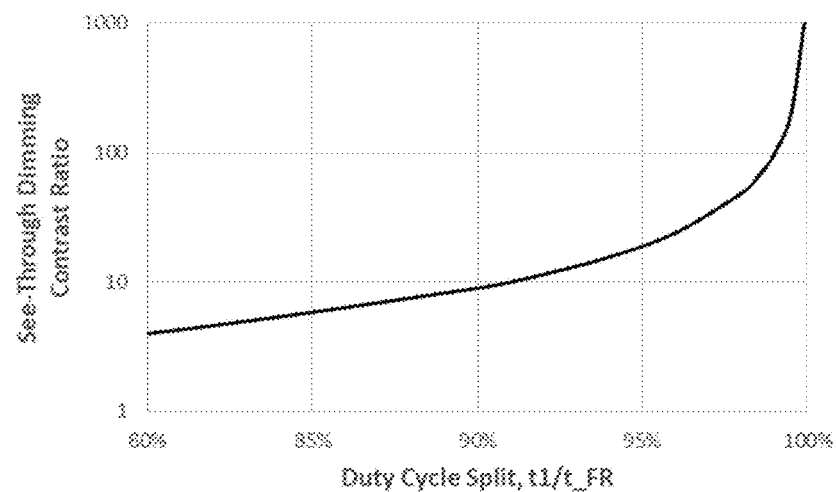
Figure 5A:
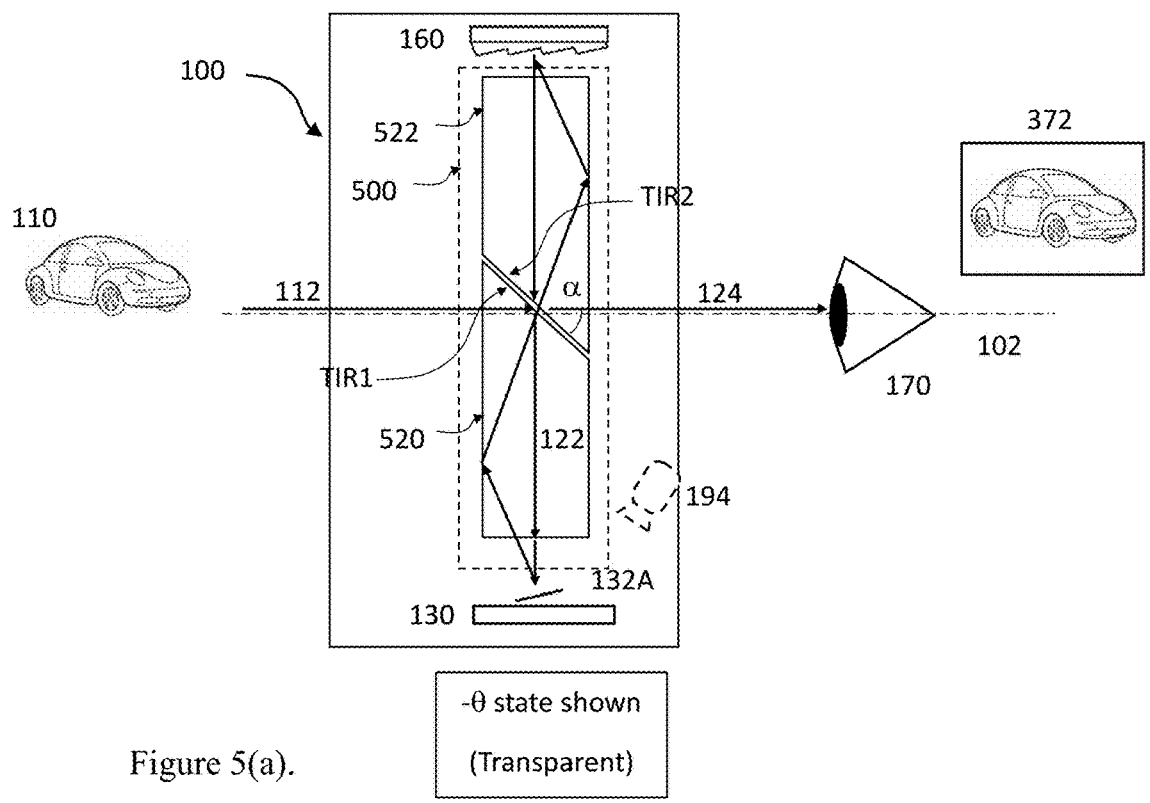
FIG. 5. A planar waveguide approach according to present invention using spatio-temporal multiplexing and trapezoidal TIR prisms for the routing combiner optic 500 where the DMD SLM is located at either top or bottom or on one edge of the waveguide: 5(a) when the DMD SLM is in −θ state; 5(b) when the DMD SLM is in +θ state.
Figure 5B:
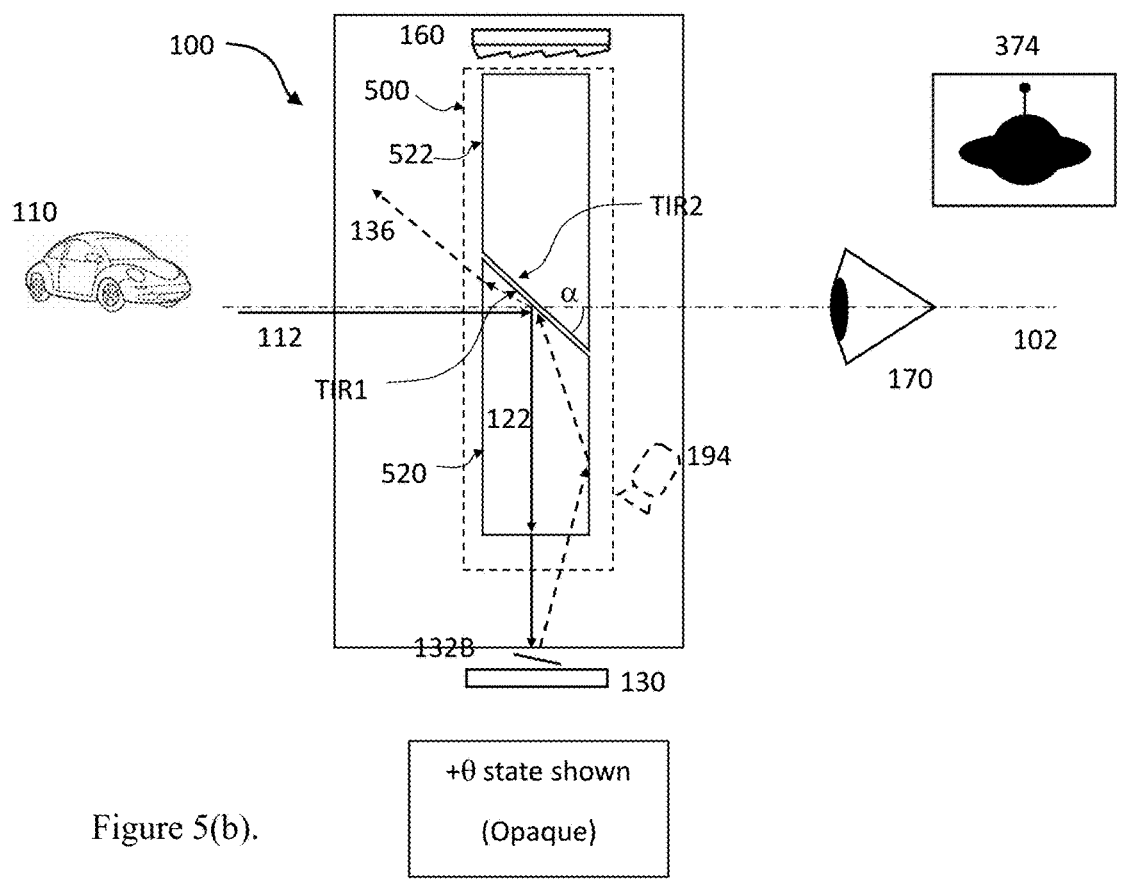
Figure 8A:
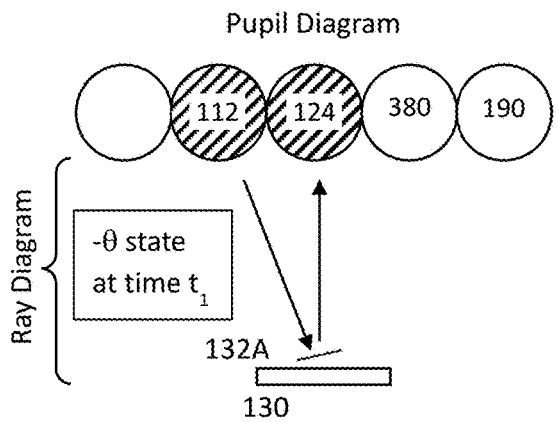
FIG. 8. System optical pupil and ray diagrams for a tilt-only DMD pixel showing input output routing scheme for both illuminants when the DMD pixel is in: 8(a) −θ state during the time $t_1$; 8(b) +θ state during the time $t_1$; 8(c) −θ state during the time $t_2$; 8(d) +θ state during the time $t_2$; 8(e) +θ state during an additional the time $t_3$ for routing the Lightfield, 112, arriving from the Real World Scene, 110, to a camera, 194.
Figure 8C:
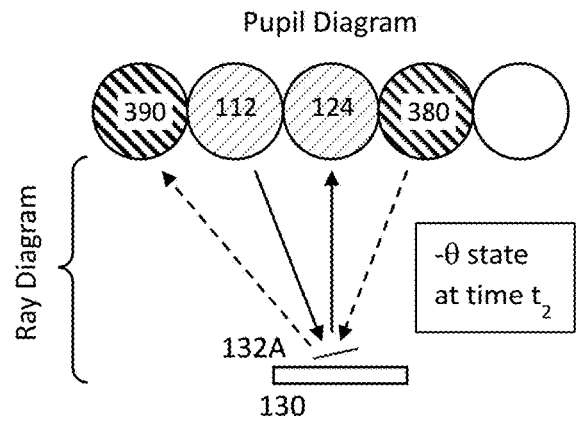
Figure 8B:
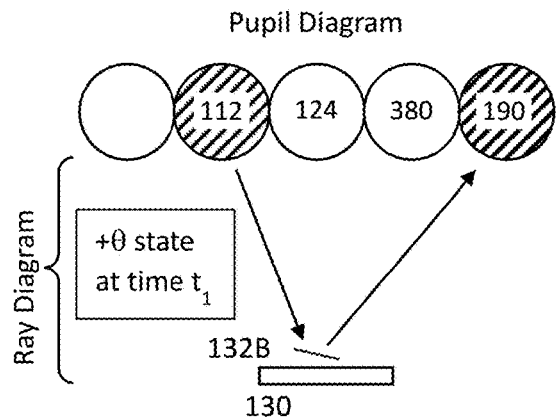
Figure 8D:
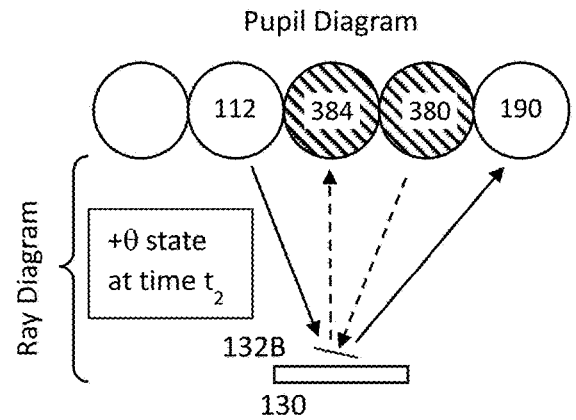
Figure 8E:
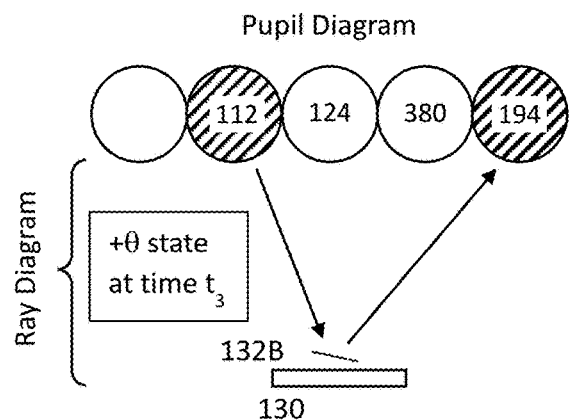
Figures 9A, 9C:
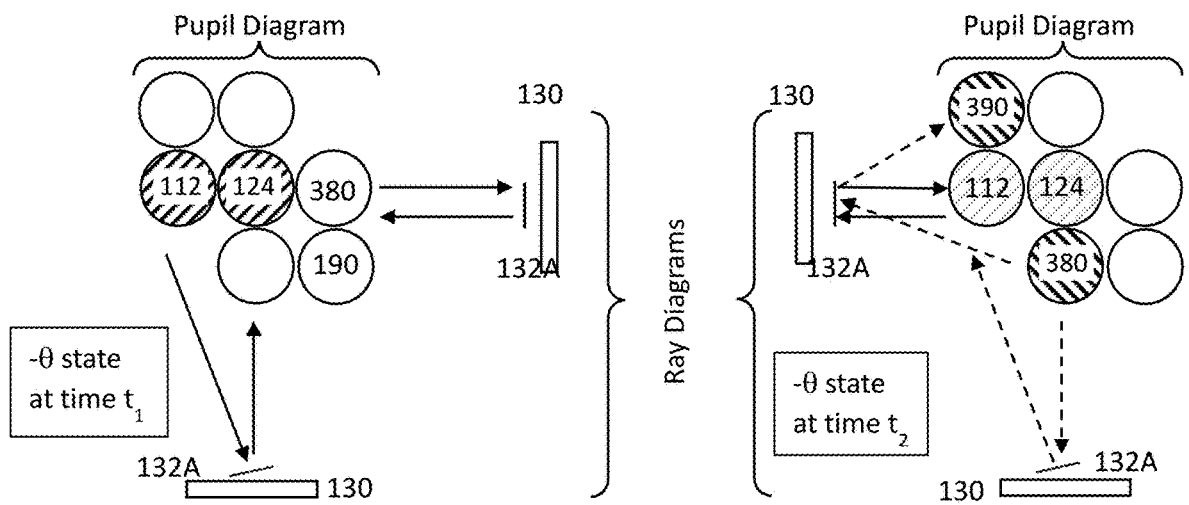
FIG. 9. System optical pupil and ray diagrams for a Tilt-and-Roll (TRP) DMD pixel showing input output routing scheme for both illuminants when the DMD pixel is in: 9(a) −θ state during the time $t_1$; 9(b) +θ state during the time $t_1$; 9(c) −θ state during the time $t_2$; 9(d) +θ state during the time $t_2$; 9(e) +θ state during an additional the time $t_3$ for routing the Lightfield, 112, arriving from the Real World Scene, 110, to a camera, 194.
Figures 9B, 9D:
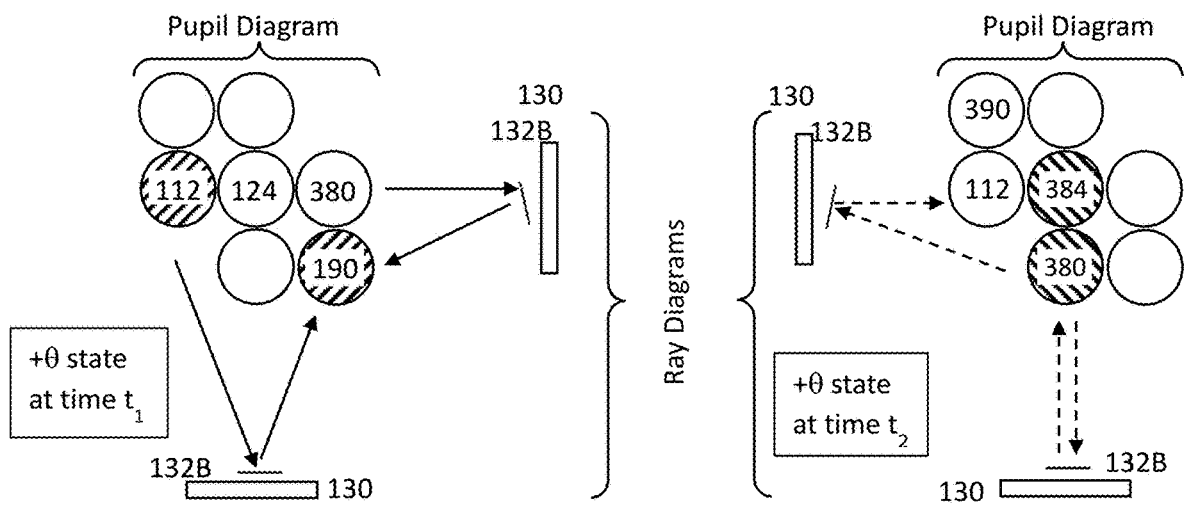
Figure 9E:
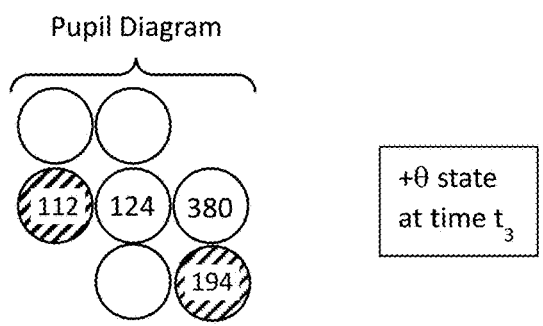
Figure 11:
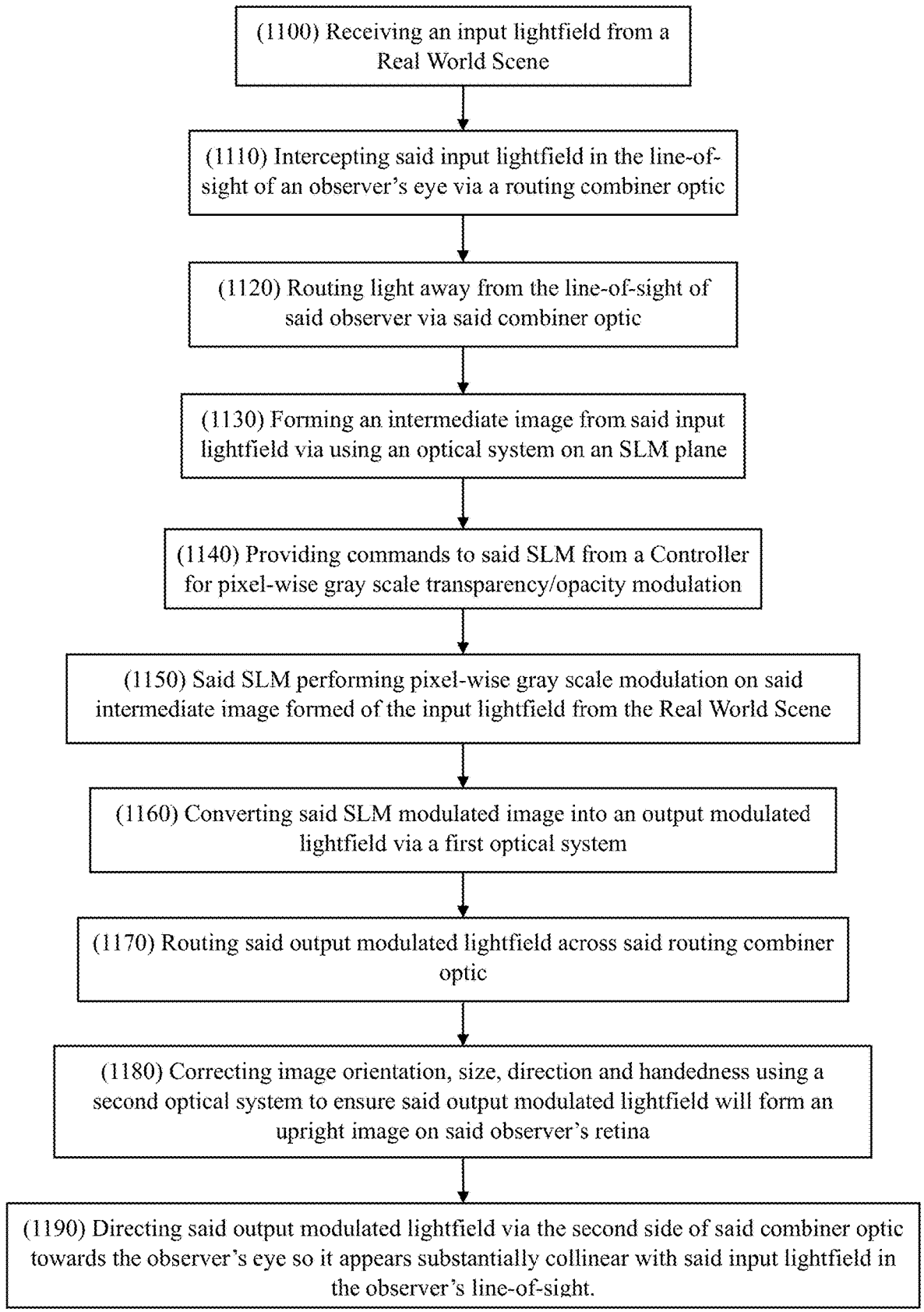
FIG. 11. Step-wise method description according to present invention showing the various steps needed for achieving Spatio-Temporal multiplexing using a single SLM.
Figure 12A:
FIG. 12(a) shows a view from the temple side using two trapezoidal prisms 520 and 522.
Figure 12B:
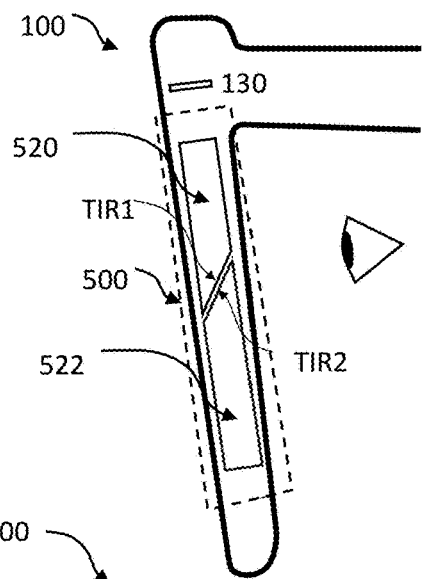
FIG. 12(b) shows a view from the temple side using two parallelogram prisms 520 and 522.
Figure 12B:
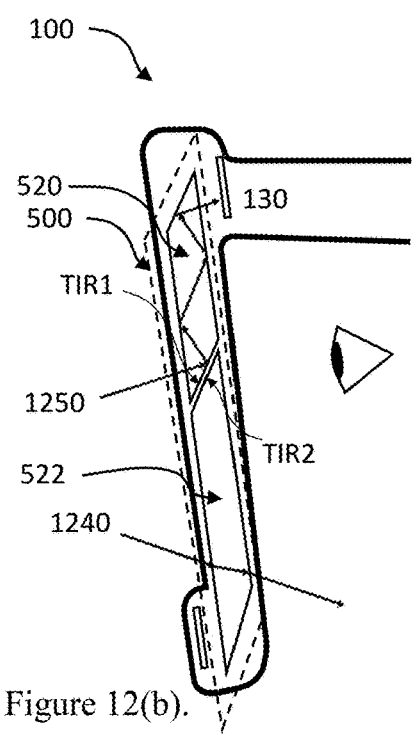
Figure 12C:
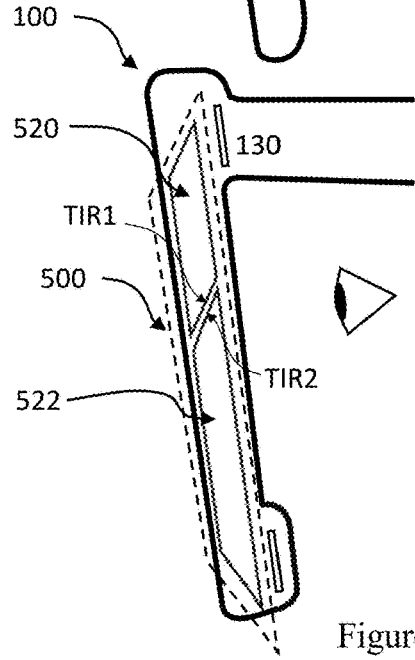
FIG. 12(c) shows a view from the temple side using a parallelogram prism 520 and a trapezoidal prism 522.
Figure 12D:
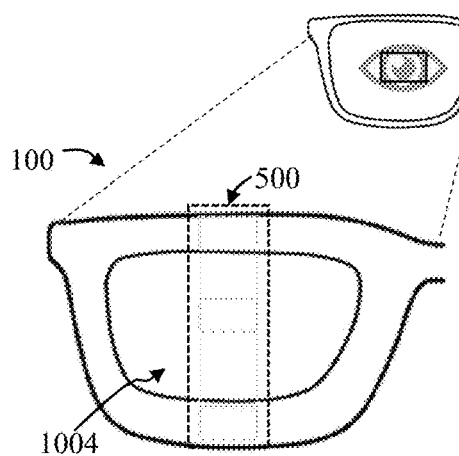
FIG. 12(d) shows front view of the spectacles using two trapezoidal prisms 520 and 522 stacked vertically and FIG. 12(*e*) shows front view of the spectacles using two trapezoidal prisms 520 and 522 stacked horizontally.
Figure 12E:
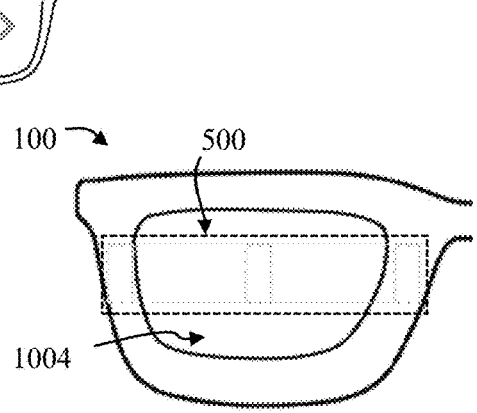
FIG. 12. A view of how a spectacle lens may look like when utilizing a compact planar waveguide approach 500 as shown earlier in FIGS. 5 and 10.
Figures 13A, 13B, 13C:
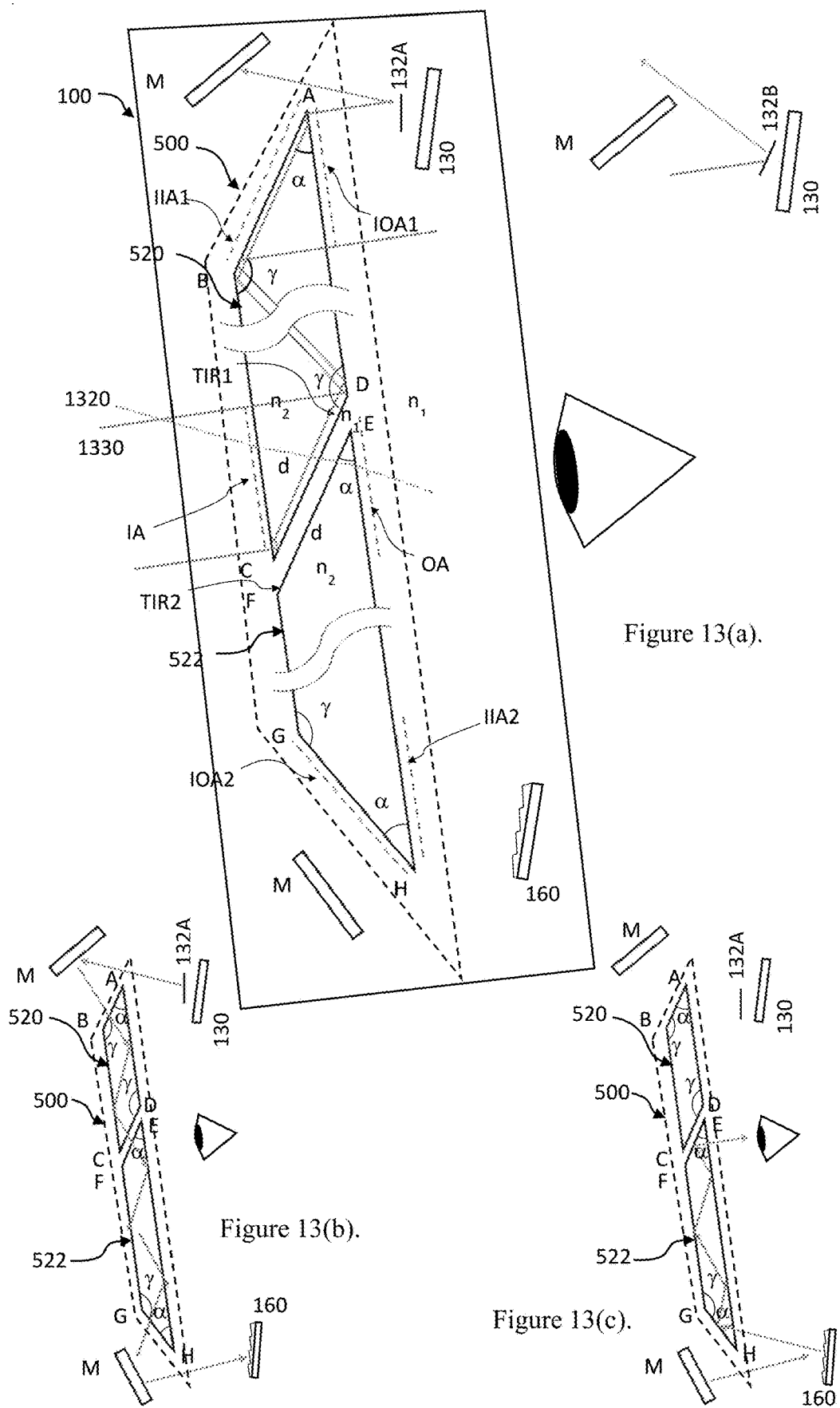
FIG. 13. A side view of detailed light routing scheme in a spectacle lens when utilizing a compact planar waveguide routing combiner optic 500 as shown earlier in FIGS. 5, 10 and 12.

What is claimed:

1. An electronic display apparatus, comprising:
   a controller (140);
   at least one light routing combiner optic, OC (120), located in a line-of-sight (102) of an observer (170) at an angle (13) to the line-of-sight (102); said OC (120) having a first side for input and a second side for output;
   at least one spatial light modulator, SLM (130); said SLM (130) comprising:
     a plurality of pixels; wherein each pixel (132) can modulate light in at least two angular states (132A and 132B); and said SLM (130) is connected to said controller (140);
   at least one imaging optic, S1, located along a light path between said OC (120) and said SLM (130);
   at least one set of relay optics (150, 152);
   at least one optical element (160);
   wherein at least in a portion of said observer's field of view, said first side of said OC (120) is meant for intercepting a substantial majority of an incident lightfield (112) and routing it to S1; wherein S1 is meant for forming a first intermediate image (122) from said lightfield; wherein said first intermediate image (122) serves as at least a first illuminant on said SLM plane;
   wherein said controller (140) is responsible for providing pixel-wise transparency commands (142) to said SLM (130) at a frame time interval, $t_{FR}$;
   wherein an SLM pixel (132), in a first angular state, 132A, routes light (124) to said relay optics (150, 152); whereas in a second angular state, 132B, said SLM pixel (132) routes light (136) to a beam dump (190); whereby such pixel-wise angular modulation of light results in modulating said first intermediate image for pixel-wise transparency;
   wherein said relay optics (150, 152) and optical element (160) fold the light path for transparency modulated lightfield (124) such that it is incident on said second side of OC (120) thereby returning a transparency modulated output lightfield (124) to the observer's line-of-sight 102 such that said input lightfield (112) and said transparency modulated output lightfield (124) are substantially collinear;
   wherein the angular routing of light towards (124) the observer's eye creates a transparent state; and the angular routing of light away (136) from the observer's eye creates an opaque state; wherein the observer (170) visually perceives (172) the real world scene (110) to be pixel-wise selectively transparency-modulated (124);
   wherein the use of said light routing combiner optic (120) enables substantially higher throughput efficiency than that obtained when using polarization based optical combiner.

2. The electronic display apparatus defined in claim 1, wherein said first side and said second side of OC (120) are substantially located on the opposite sides of a single optical substrate.

3. The electronic display apparatus defined in claim 1, wherein OC (120) is chosen from amongst at least one of the following: Metallic Mirror, Dielectric Mirror Coating, Thin Film Coating, Multilayer Thin Film Coating, Multilayer Optical Films, Notch Reflective Polarizers, Bragg Reflective Polarizers, Volume Phase Gratings, Holographic Gratings, Volume multiplexed Holographic Gratings, Angle multiplexed Holographic Gratings, Polarization multiplexed Holographic Gratings, Liquid Crystal Gratings, Polymerized Liquid Crystal Gratings, MacNeille type thin film coated cube.

4. The electronic display apparatus defined in claim 1, wherein the SLM is chosen from amongst one of the following: Digital Light Processing, Digital Micromirror Device, Micro Electro Mechanical Systems, or Liquid Crystal on Silicon.

5. The electronic display apparatus defined in claim 1 includes at least one camera (194); and wherein the frame time interval, $t_{FR}$ is sub-divided into a first time period, $t_1$, for Transparency modulation (142); and a second time period, $t_3$, during which the SLM (130) globally routes all the light to the camera (194) for capturing a first-person view of the scene in front of the observer.

6. The electronic display apparatus defined in claim 5 wherein an aperture of said camera is only opened during the second time-period.

7. The electronic display apparatus defined in claim 1 includes at least one camera (194); and wherein the frame time interval, $t_{FR}$ is sub-divided into a first time period, $t_1$, for Transparency modulation (142); and a second time period, $t_3$, during which the SLM (130) globally routes all the light to the camera (194) for capturing a first-person view of the scene in front of the observer; wherein the time durations $t_1$ and $t_3$ are adjusted for a desirable balance between the see-through transparency and a proper exposure for the camera sensor (194).

8. The electronic display apparatus defined in claim 1 includes at least a second powered optical element, S2, located along a light path between said optical element (160) and the second side of said routing combiner optic OC (120); wherein S2 forms a second intermediate image from the modulated lightfield on the surface of said optical element (160).

9. The electronic display apparatus defined in claim 1, wherein said SLM (130) is pulse width modulated.

10. The electronic display apparatus defined in claim 1 wherein said optical element (160) is a second SLM.

11. The electronic display apparatus defined in claim 1 wherein said optical element (160) is a passive replica of said SLM (130) in a globally fixed single angular state, either 132A, or 132B.

12. The electronic display apparatus defined in claim 1 includes at least a second illuminant (380) for said SLM; and wherein the frame time interval, $t_{FR}$ (410) is sub-divided into a first time period, $t_1$ (420), for Transparency modulation (142) wherein said SLM(130) creates transparency-modulated lightfield (124); and a second time period, $t_2$ (430), during which said controller (140) provides Digital virtual image data (144) to said SLM (130); wherein said SLM (130) creates a Digital virtual image (384); wherein the observer (170) visually perceives a time-averaged image (376).

13. The electronic display apparatus defined in claim 1 includes at least a second illuminant (380) for said SLM; and wherein said frame time interval, $t_{FR}$ (410) is sub-divided into a first time period, $t_1$ (420), for Transparency modulation (142) wherein said SLM(130) creates transparency-modulated lightfield (124); and a second time period, $t_2$ (430), during which said controller (140) provides Digital virtual image data (144) to said SLM (130); and wherein during said second time period, $t_2$ (430), said SLM (130) creates a Digital virtual image (384); and a third time period, $t_4$, wherein said SLM (130) globally routes all the pixels to said angular state, 132A so a uniformly small amount of lightfield leaks into the observer's viewing window;
wherein the observer visually perceives a time-averaged image (376) with uniform contrast across the image area.

14. A method of displaying images, comprising:
receiving (1100) a lightfield (112) in a user's line-of-sight (102), intercepting (1110) said lightfield via a light routing combiner optic (120); routing (1120) a substantial majority of said lightfield (112) away from the line-of-sight (102) of the user's eye (170) via a first side of said light routing combiner optic (120); forming (1130) an intermediate image (122) to serve as at least a first illuminant on a Spatial Light Modulator plane (130) from a first spatial direction, (−2θ); providing (1140) commands (142) at least in a first portion, $t_1$, of a frame time interval, $t_{FR}$, to said SLM (130) for pixel-wise gray scale transparency/opacity modulation from a controller (140); performing (1150) pixel-wise gray scale transparency/opacity modulation on said intermediate image (122); converting (1160) the transparency/opacity-modulated intermediate image (124) back into a lightfield using an optical system; routing (1170) said modulated lightfield (124) across said routing combiner optic (120); correcting (1180) image orientation, size, direction and handedness using a second optical system to ensure said modulated lightfield will form an upright image; directing (1190) said lightfield (124) via said second side of said combiner optic towards the user's eye (170) so it (124) appears substantially collinear with said input lightfield (112) in the user's line-of-sight (102);
wherein the use of said light routing combiner optic (120) enables substantially higher throughput efficiency than that obtained when using polarization based optical combiner.

15. The method defined in claim 14 includes introducing a second portion, $t_2$, in said frame time interval, $t_{FR}$, wherein a second illuminant (380) is made incident on said SLM (130) from a second spatial direction, (+2θ).

16. The method defined in claim 14 includes introducing a second portion, $t_2$, in said frame time interval, $t_{FR}$, wherein a second illuminant (380) is made incident on said SLM (130) from a second spatial direction, (+2θ), wherein both illuminants (122) and (380) are simultaneously ON and incident on said SLM (130) for at least a portion of said frame time, $t_{FR}$.

17. A planar waveguide routing combiner optic, 500, comprising:
at least a first trapezoidal prism, 520, and at least a second trapezoidal prism, 522;
wherein
said first trapezoidal prism, 520, and said second trapezoidal prism, 522, have substantially identical acute, α, and obtuse angles, γ;
wherein said first trapezoidal prism, 520, and said second trapezoidal prism, 522, have substantially identical length, d, for their legs CD and EF;
wherein said acute angle corner, α, of said first trapezoidal prism, 520, is located adjacent to said obtuse angle corner, γ, of said second trapezoidal prism, 522, such that an adjoining base, BC of said first trapezoidal prism 520 forms a substantially single planar surface with an adjoining base, FG of said second trapezoidal prism 522; and wherein
a leg, CD of said first trapezoidal prism 520 and a leg, EF of said second trapezoidal prism 522 are located adjacent to each other substantially parallel with a thin air gap forming a first optical interface of High Index-Low Index (TIR1) and a second optical interface of High Index-Low Index (TIR2);
wherein for a first range of incident angles, a light 1320 entering said device 500 through an input aperture, $I_A$, propagates inside said first trapezoidal prism, 520, passes through said TIR1 and TIR2 surfaces, refracts inside said second trapezoidal prism, 522 and exits through an output aperture, OA;
wherein for a second range of incident angles, a light 1330 entering said combiner optic, 500, through said input aperture, $I_A$, is refracted into said first trapezoidal prism, 520, propagates inside said first trapezoidal prism, 520, and is total-internally-reflected from TIR1 interface and waveguided laterally inside said first trapezoidal prism 520 and exits through an intermediate output aperture IOA1;
wherein the use of said planar waveguide routing combiner optic, 500, enables substantially higher throughput efficiency than that obtained when using polarization based optical combiner.

18. The planar waveguide routing combiner optic, 500, defined in claim 17, wherein at least one of said trapezoidal prisms is a parallelogram prism.

19. The planar waveguide routing combiner optic, 500, defined in claim 17, includes:
a controller (140);
at least one spatial light modulator, SLM (130); said SLM (130) comprising:
a plurality of pixels; wherein each pixel (132) can modulate light in at least two angular states (132A and 132B);
at least one imaging optic, S1, located along a light path proximal to said SLM (130);
wherein said light rays entering said combiner optic, 500, through said input aperture, $I_A$, in said second range of incident angles 1330 is total-internally-reflected from TIR1 interface and waveguided laterally inside said first trapezoidal prism waveguide, 520, and exits through an intermediate output aperture, IOA1 and forms an intermediate image (122) on said SLM (130) using said imaging optic, S1;
wherein said intermediate image (122) serves as at least a first illuminant on said SLM plane (130) from a first spatial direction, (−2θ); wherein said controller (140) provides commands (142) at least in a first portion, $t_1$, of a frame time interval, $t_{FR}$, to said SLM (130) for pixel-wise gray scale transparency/opacity modulation; wherein said SLM (130) performs pixel-wise gray scale transparency/opacity modulation on said intermediate image (122); wherein said imaging optic, S1 converts said transparency/opacity-modulated intermediate image (124) back into a lightfield using said imaging optic, S1; injecting said modulated lightfield (124) into said routing combiner optic, 500, using an intermediate input aperture, IIA1; waveguiding through said first trapezoidal prism, 520; total-internally-reflecting through said first trapezoidal prism, 520; refracting through said optical interfaces TIR1 and TIR2;

extracting said lightfield (1330) via said output aperture, OA out of said combiner optic 500 substantially collinearly with said input lightfield (1330).

20. A planar waveguide routing combiner optic, 500, according to claim 17, substantially as hereinbefore and with reference to the accompanying drawings in this disclosure.

21. The planar waveguide routing combiner optic, 500, defined in claim 17, includes:

a controller (140);

at least one spatial light modulator, SLM (130); said SLM (130) comprising:

a plurality of pixels; wherein each pixel (132) can modulate light in at least two angular states (132A and 132B);

at least one imaging optic, S1, located along a light path proximal to said SLM (130);

wherein said light rays entering said combiner optic, 500, through said input aperture, $I_A$, in said second range of incident angles 1330 is total-internally-reflected from TIR1 interface and waveguided laterally inside said first trapezoidal prism waveguide, 520, and exits through an intermediate output aperture, IOA1 and forms an intermediate image (122) on said SLM (130) using said imaging optic, S1;

wherein said intermediate image (122) serves as at least a first illuminant on said SLM plane (130) from a first spatial direction, (−2θ); wherein said controller (140) provides commands (142) at least in a first portion, $t_1$, of a frame time interval, $t_{FR}$, to said SLM (130) for pixel-wise gray scale transparency/opacity modulation; wherein said SLM (130) performs pixel-wise gray scale transparency/opacity modulation on said intermediate image (122); wherein said imaging optic, S1 converts said transparency/opacity-modulated intermediate image (124) back into a lightfield using said imaging optic, S1; injecting said modulated lightfield (124) into said routing combiner optic, 500 using an intermediate input aperture, IIA1; waveguiding through said first trapezoidal prism, 520; total-internally-reflecting through said first trapezoidal prism, 520; refracting through said optical interfaces TIR1 and TIR2;

extracting said lightfield (1330) via said output aperture, OA out of said combiner optic 500 substantially collinearly with said input lightfield (1330);

wherein said frame time interval, $t_{FR}$, includes a second portion, $t_2$, during which a second illuminant (380) is made incident on said SLM (130) from a second spatial direction, (+2θ), wherein both illuminants (122) and (380) are simultaneously ON and incident on said SLM (130) for at least a portion of said frame time, $t_{FR}$.

* * * * *